United States Patent
Koga et al.

(10) Patent No.: US 8,121,202 B2
(45) Date of Patent: Feb. 21, 2012

(54) POWER-LINE COMMUNICATION METHOD, POWER-LINE COMMUNICATION DEVICE, AND POWER-LINE COMMUNICATION SYSTEM

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 788 days.

(21) Appl. No.: 12/129,286

(22) Filed: May 29, 2008

(65) Prior Publication Data
US 2008/0304577 A1 Dec. 11, 2008

(30) Foreign Application Priority Data

May 30, 2007 (JP) ................ P.2007-143794
Apr. 8, 2008 (JP) ................ P.2008-100545

(51) Int. Cl.
*H04L 27/00* (2006.01)
(52) U.S. Cl. ......... 375/259; 455/304; 375/296; 375/258
(58) Field of Classification Search .................. 455/304; 375/259, 296, 224, 285; 370/229
See application file for complete search history.

(56) References Cited

U.S. PATENT DOCUMENTS

| | | | |
|---|---|---|---|
| 4,377,804 A | 3/1983 | Suzuki | |
| 4,845,466 A | 7/1989 | Hariton | |
| 4,988,972 A | 1/1991 | Takagi | |
| 5,553,081 A * | 9/1996 | Downey et al. | 714/709 |
| 5,828,293 A | 10/1998 | Rickard | |
| 6,115,429 A | 9/2000 | Huang | |
| 6,404,822 B1 * | 6/2002 | Ben-Michael et al. | 375/296 |
| 7,307,357 B2 | 12/2007 | Kopp | |
| 2004/0208139 A1 | 10/2004 | Iwamura | |
| 2005/0190785 A1 | 9/2005 | Yonge, III | |
| 2007/0025391 A1 | 2/2007 | Yonge, III | |
| 2009/0238288 A1 * | 9/2009 | Kodama et al. | 375/259 |

FOREIGN PATENT DOCUMENTS

| | | |
|---|---|---|
| EP | 1 569 358 | 8/2005 |
| JP | 2001-230708 | 8/2001 |
| JP | 2002-319878 | 10/2002 |
| JP | 2003-338778 | 11/2003 |
| JP | 2006-333046 | 12/2006 |
| WO | 2006/073138 | 7/2006 |
| WO | 2006/126738 | 11/2006 |
| WO | 2007/004742 | 1/2007 |
| WO | 2007/043705 | 4/2007 |

OTHER PUBLICATIONS

International Search Report dated Sep. 17, 2008.

* cited by examiner

*Primary Examiner* — Phuoc Doan
(74) *Attorney, Agent, or Firm* — Dickinson Wright PLLC

(57) ABSTRACT

To provide a power-line communication method, a power-line communication device, and a power-line communication system, which can make communication with high communication efficiency even when the condition of a power line is changed. In step S101, a noise detection process is performed in correspondence to a time domain synchronized with a power source cycle of a power line. In step S102, a communication channel decision process of generating communication channels in the time domain is performed on the basis of the noise condition detected in step S101. In step S103, tone maps are prepared for the communication channels generated in step S102. When the preparation of the tone maps is ended, the tone maps are transmitted to a destination PLC and data are transmitted and received between a transmission-side PLC and a reception-side PLC by the use of the same tone map (step S104).

22 Claims, 25 Drawing Sheets

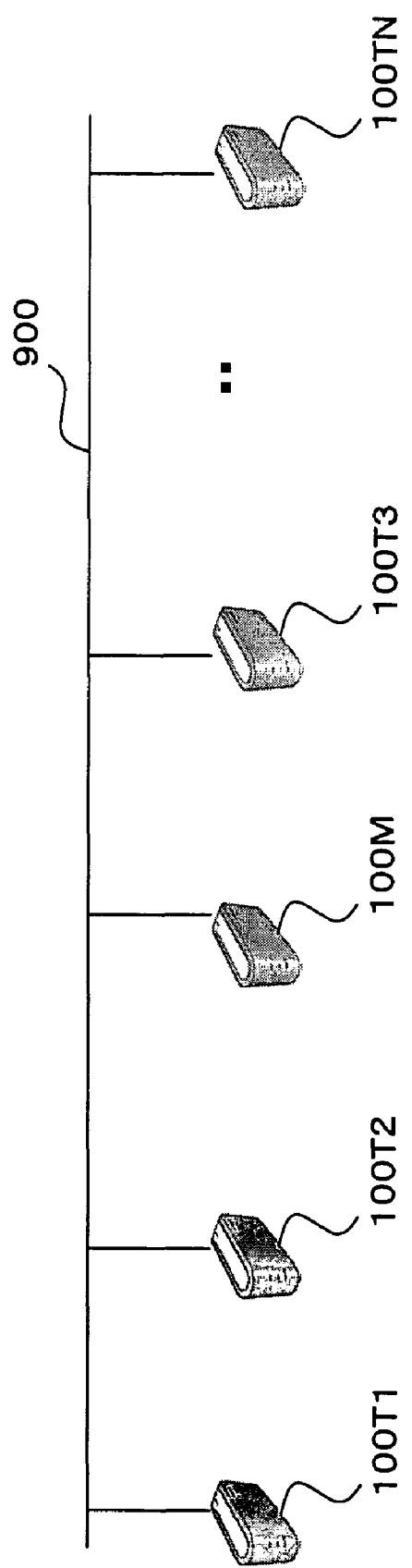

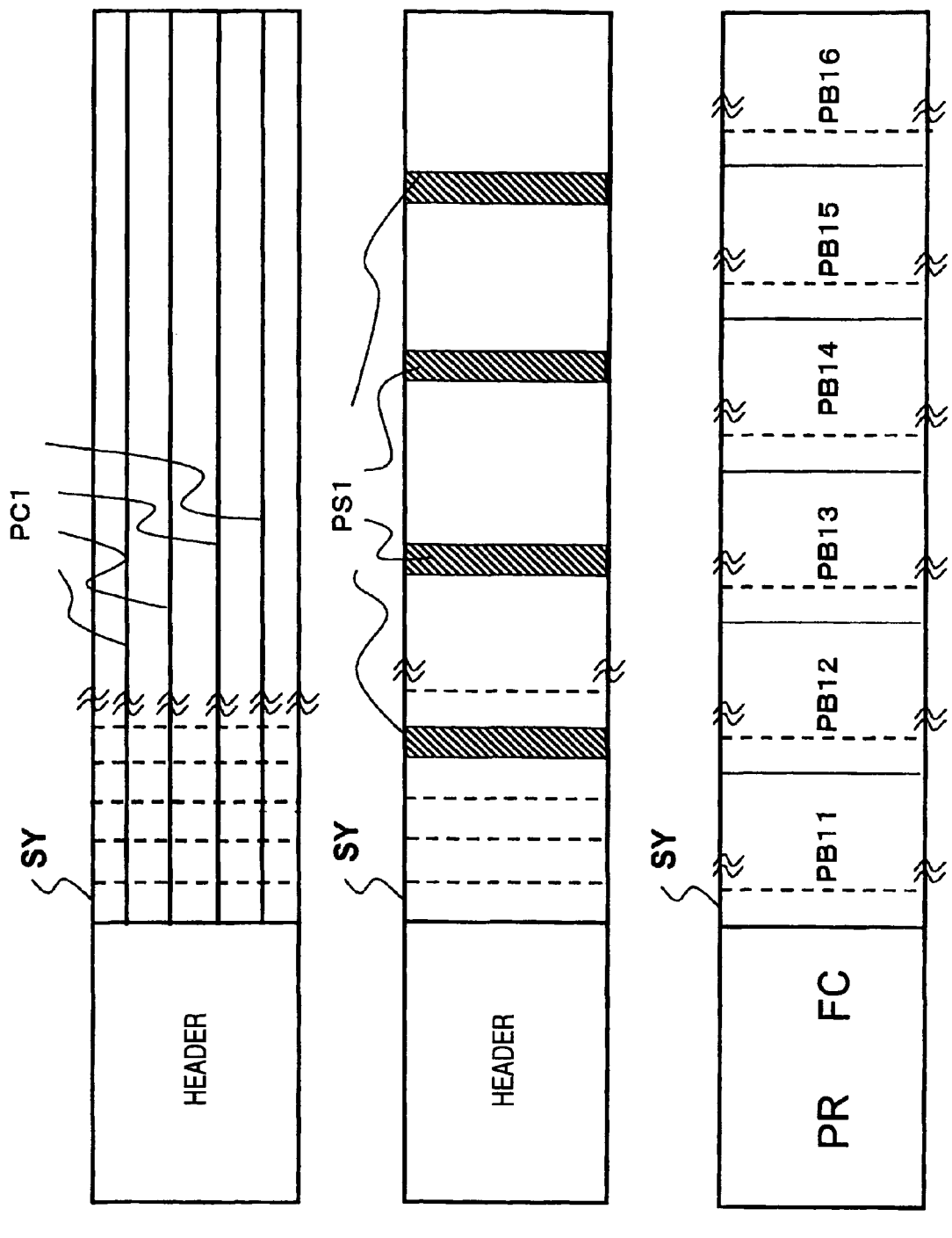

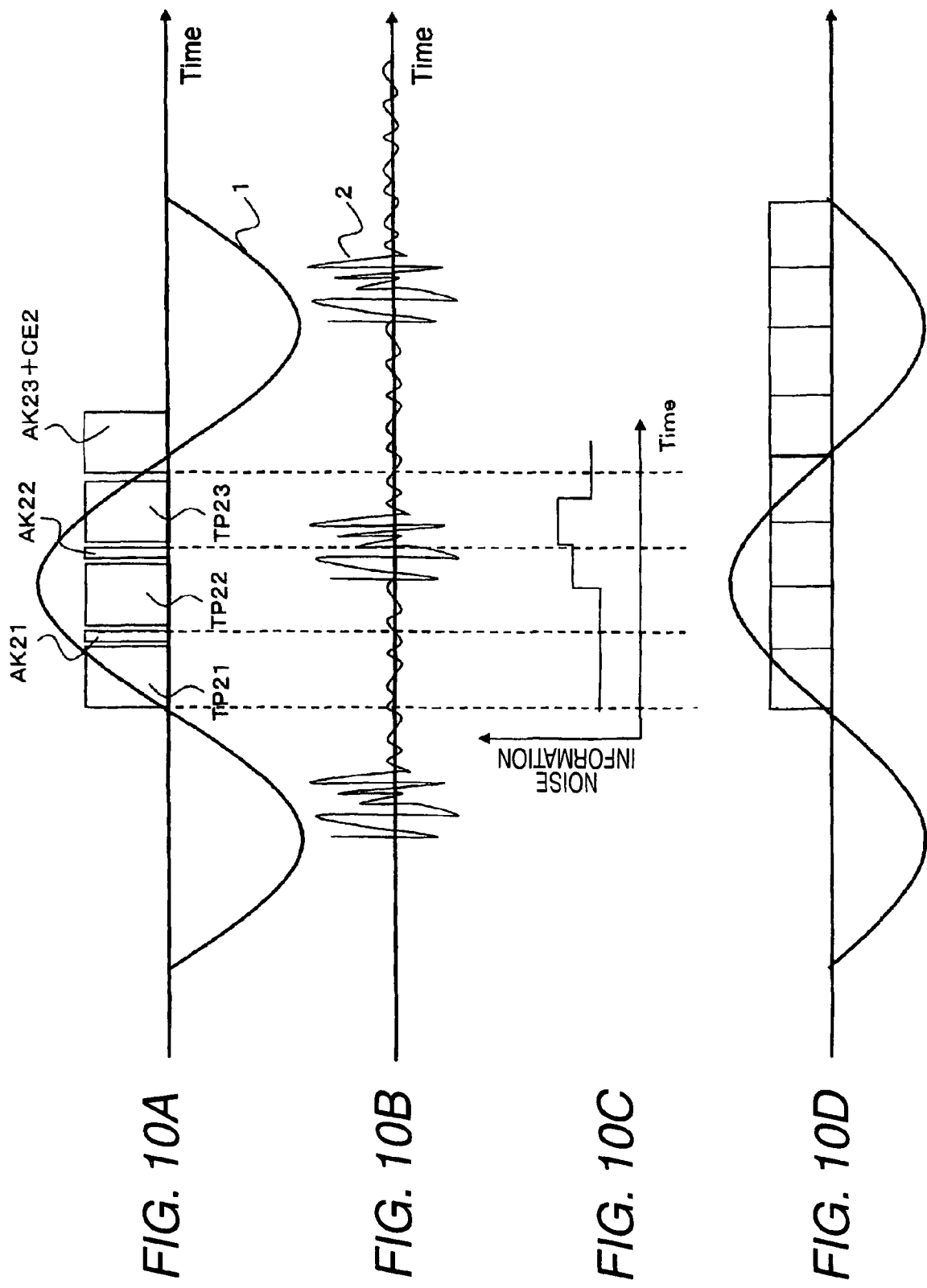

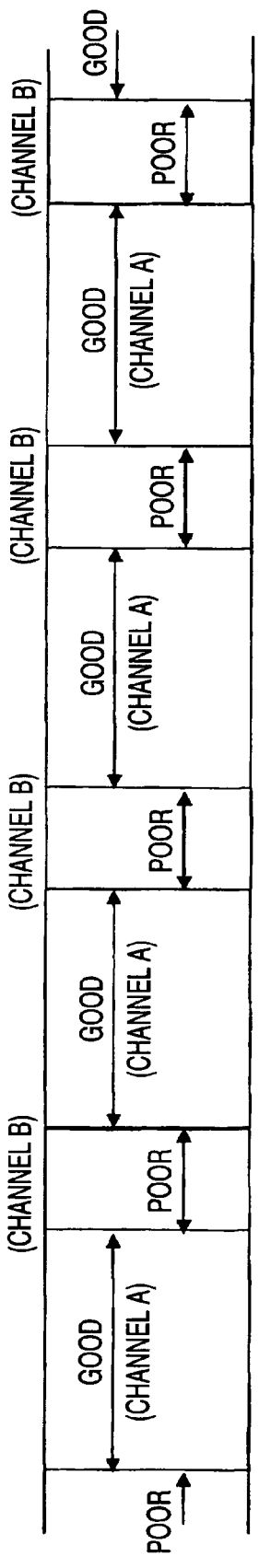
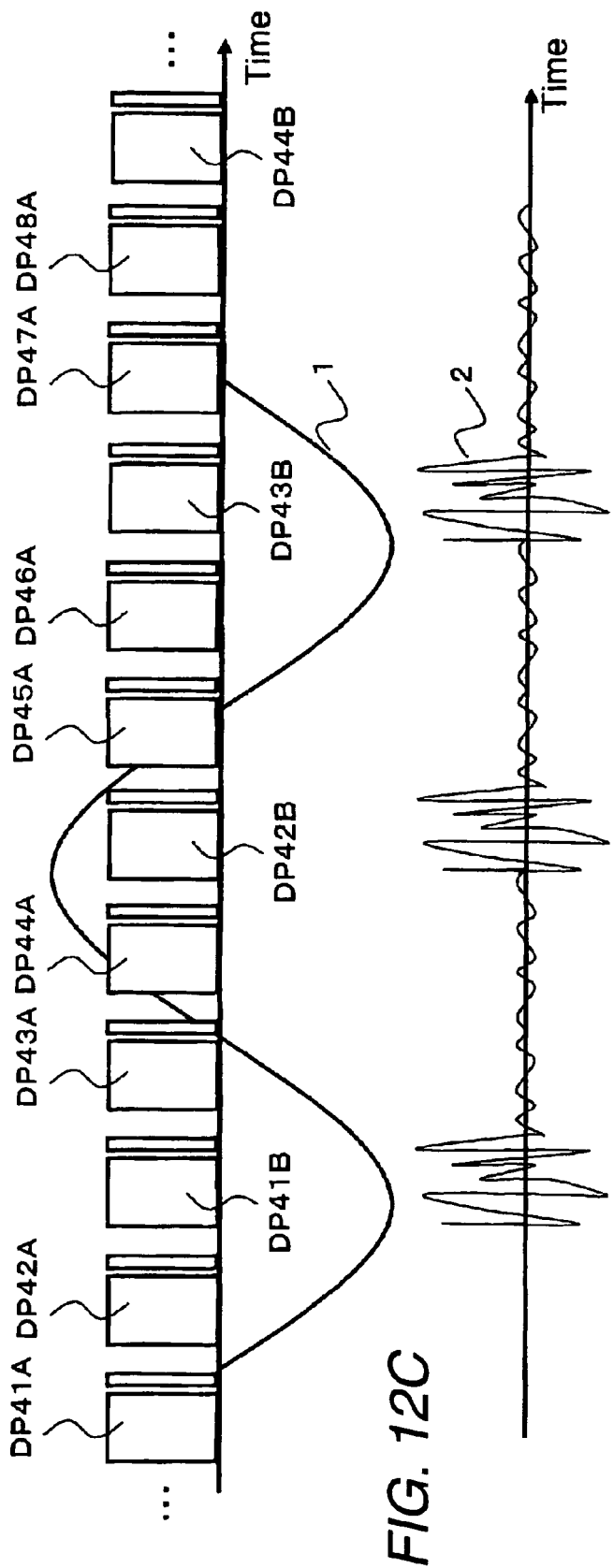
FIG. 12A
FIG. 12B
FIG. 12C

TMC : 01111011111111101111 · · · : TM1 : TM2 : TM3 : · · ·

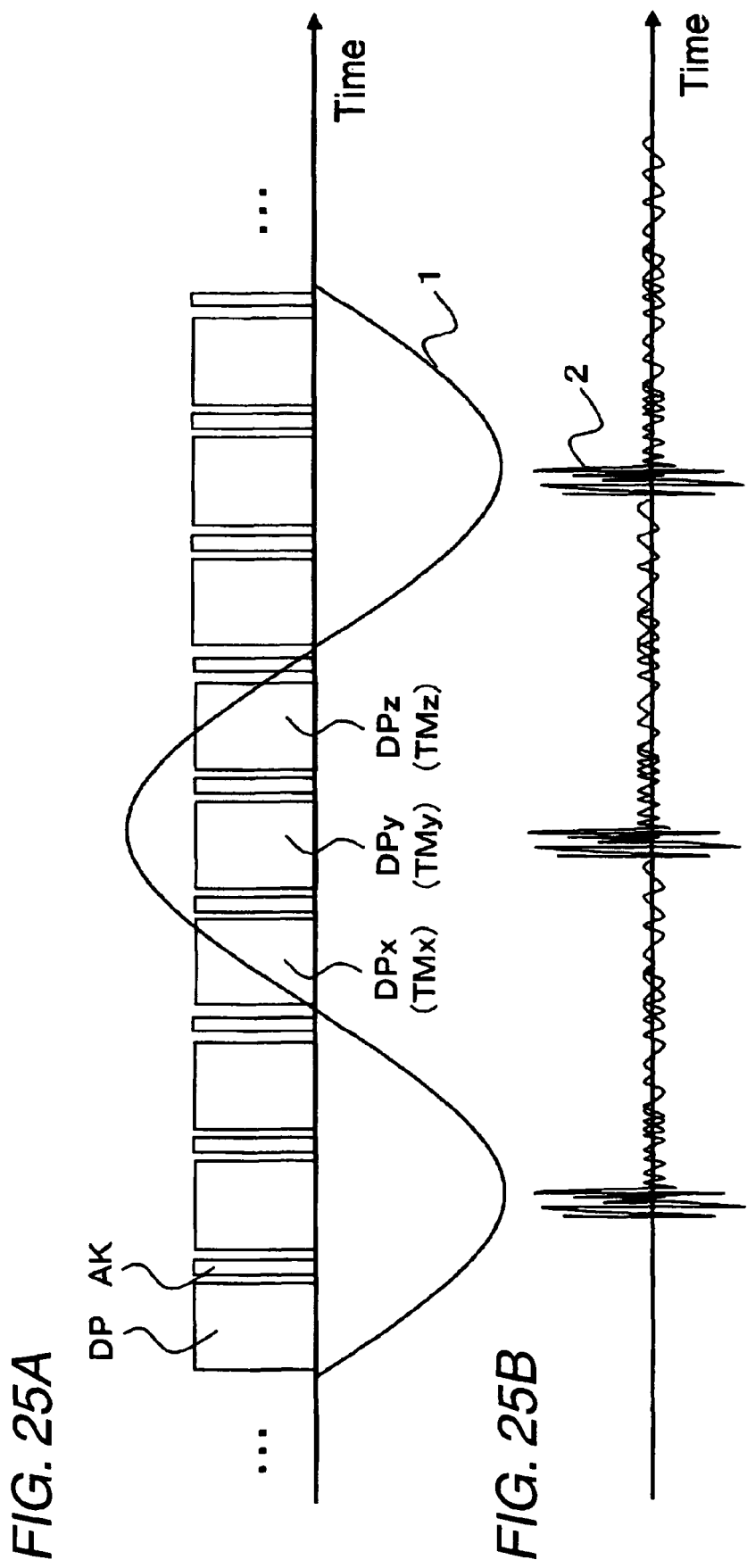

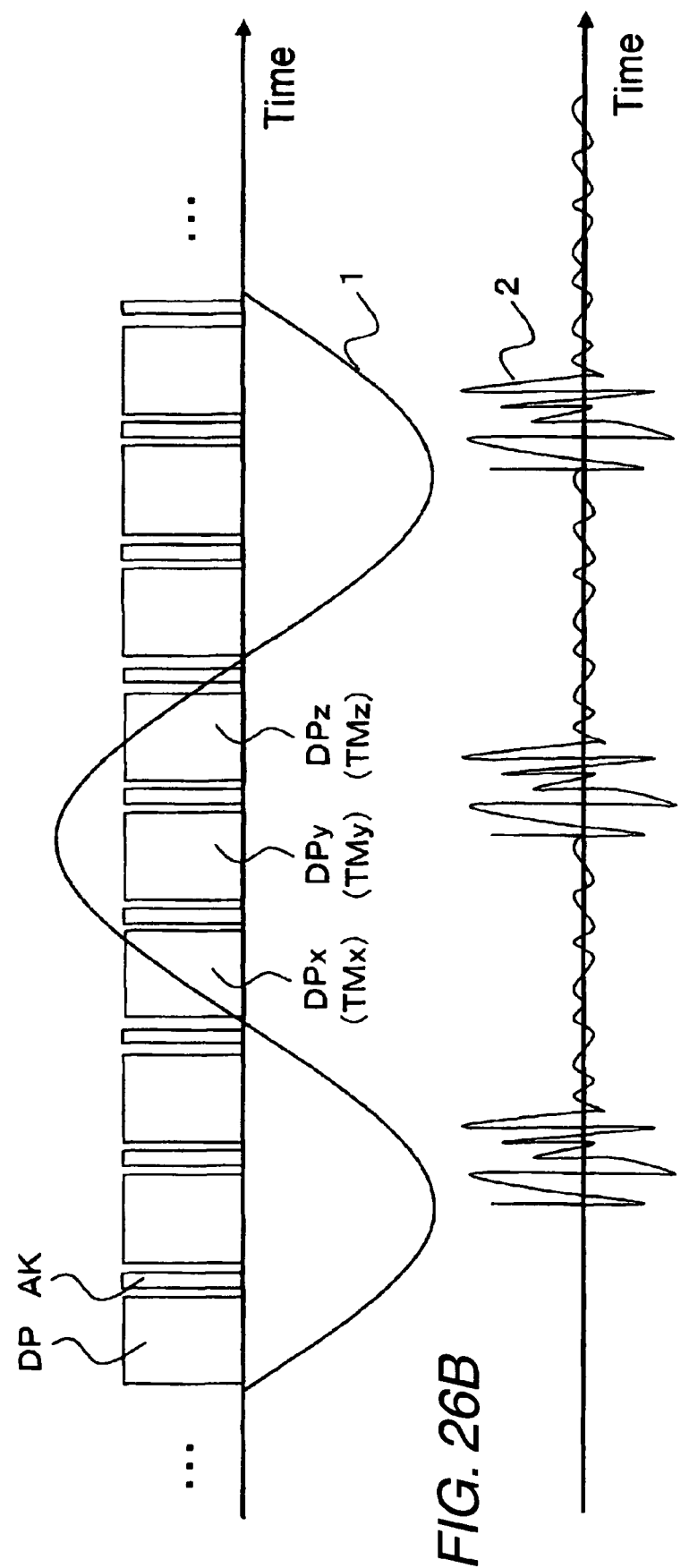

POWER-LINE COMMUNICATION METHOD, POWER-LINE COMMUNICATION DEVICE, AND POWER-LINE COMMUNICATION SYSTEM

BACKGROUND

The present invention relates to a power-line communication method, a power-line communication device, and a power-line communication system, which make multi-carrier communication using a power line as a communication medium.

It is known that noises synchronized with an AC power source cycle exist in a power line. Accordingly, when communication is made using a power line as a communication medium, efficient communication might be made by transmitting and receiving packets in synchronization with the AC power source cycle. FIG. 25 shows an example of a tone map assignment process in a conventional power-line communication. FIG. 25 shows a packet train synchronized with a cycle of an AC power source 1, where a data packet DP and an acknowledgment packet AK are alternately transmitted. FIG. 25 shows a noise level of the power line as a communication medium, where the noise is synchronized with the cycle of the AC power source 1. The system shown in FIG. 25 transmits and receives three packets in synchronization with a half cycle of the AC power source. Data packets DPx, DPy, and DPz having reference signs in a half cycle are packets corresponding to tone maps TMx, TMy, and TMz in accordance with the noise level. For example, the band of packet DPx is 100 Mbps, the band of packet DPy is 20 Mbps, and the band of packet DPz is 10 Mbps. The noise level is greater in the periods of time of packets DPy and DPz. Accordingly, when the tone maps are used to make communication, an error does not occur or is small. A power-line communication technique of grasping characteristics of a communication medium, preparing tone maps, and making map-carrier communication is described in Patent Document 1.

However, the power line is not more stable than other communication lines and has a great variation in characteristics due to connection to electrical instruments and the like. FIG. 26 shows a variation in condition of a power line in the power-line communication system shown in FIG. 25. As shown in FIG. 26, when a range including a great noise level is widened and packets DPx, DPy, and DPz shown in FIG. 26 are transmitted, a noise having a level higher than an assumed level is applied to packet DPz, thereby greatly deteriorating the throughput.

[Patent Document 1] JP-A-2006-333046

SUMMARY

The invention is contrived in view of the above-mentioned situations. An object of the invention is to provide a power-line communication method, a power-line communication device, and a power-line communication system, which can make communication with high communication efficiency even when the condition of a power line is changed.

According to an aspect of the invention, there is provided a power-line communication method of performing multi-carrier communication with a communication device using a power line as a communication medium, the power-line communication method including: detecting a noise condition in the communication medium in correspondence to a period synchronized with a power source cycle of the power line; generating a plurality of communication channels in a time domain in accordance with a comparison result of the noise condition with a predetermined value on the basis of the noise condition detected in the noise detection process; preparing tone maps corresponding to the plurality of communication channels generated in the communication channel decision process; and transmitting and receiving data on the basis of the tone maps prepared in the tone map preparation process, wherein the communication channel decision process and the tone map preparation process are performed again after the communication process is performed.

According to the aspect of the invention, it is possible to perform power-line communication with high throughput in which an influence of periodic noise of the power line is removed even when the condition of the power line varies.

According to another aspect of the invention, there is provided a power-line communication device for performing multi-carrier communication using a power line as a communication medium, the power-line communication device including: a reception section which receives a noise condition in the communication medium sent from a reception-side power-line communication device through the power line; a transmission section which transmits a signal through the power line; and a control section which detects the noise condition in the communication medium received by the reception section in correspondence to a time domain synchronized with a power source period of the power line, generates a plurality of communication channels in the time domain on the basis of the noise condition in the communication medium, and controls the transmission section to transmit data using tone maps corresponding to the plurality of communication channels.

According to still another aspect of the invention, there is provided a power-line communication device for performing multi-carrier communication using a power line as a communication medium; the power-line communication device including: a reception section which receives a signal from the power line; a transmission section which transmits a noise condition in the communication medium to a transmission-side power-line communication devices through the power line; a control section which detects the noise condition in the communication medium in correspondence to a time domain synchronized with a power source cycle of the power line on the basis of the signal received by the reception section, prepares tone maps corresponding to each of a plurality of communication channels in the time domain generated by the transmission-side power-line communication device on the basis of the noise condition, and controls the reception section to receive data using the prepared tone maps.

According to still another aspect of the invention, there is provided a power-line communication system for performing multi-carrier communication using a power line as a communication medium, the power-line communication system including: a first power-line communication device including: a reception section which receives a noise condition in the communication medium sent from a reception-side power-line communication device through the power line; a transmission section which transmits a signal through the power line; and a control section which detects the noise condition in the communication medium received by the reception section in correspondence to a time domain synchronized with a power source cycle of the power line, generates a plurality of communication channels in the time domain on the basis of the noise condition in the communication medium, and controls the transmission section to transmit data using tone maps corresponding to the plurality of communication channels, and a second power-line communication device including: a reception section which receives a signal from the power line; a transmission section which transmits a noise condition in the communication medium to a transmission-side power-line communication devices through the power line; a control section which detects the noise condition in the communication medium in correspondence to a time domain synchronized with a power source cycle of the power line on the basis of the signal received by the reception section, prepares tone maps corresponding to each of a plurality of communication channels in the time domain generated by the transmission-side power-line communication device on the basis of the noise condition, and controls the reception section to receive data using the prepared tone maps.

According to still another aspect of the invention, there is provided an integrated circuit used for multi-carrier communication using a power line as a communication medium, the integrated circuit including: a noise detection section connected to a coupler interfacing with the power line so as to detect a noise condition in the communication medium through the coupler in correspondence to a time domain synchronized with a power source cycle of the power line; a tone map preparation section which prepares tone maps corresponding to communication channels in the time domain generated on the basis of the noise condition; and a communication control section which controls a communication section to transmit and receive data using the tone maps prepared by the tone map preparation section.

According to still another aspect of the invention, there is provided a circuit module used for multi-carrier communication using a power line as a communication medium, the circuit module including: a coupler interfacing with the power line; and a control section which detects a noise condition in the communication medium through the coupler in correspondence to a time domain synchronized with a power source cycle of the power line, prepares tone maps corresponding to communication channels in the time domain generated on the basis of the noise condition, and controls a communication section to transmit and receive data using the prepared tone maps.

As can be apparently seen from the above description, it is possible to provide a power-line communication method, a power-line communication device, and a power-line communication system, which can make communication with high communication efficiency even when the state of a power line is changed.

BRIEF DESCRIPTION OF THE DRAWINGS

The above objects and advantages of the present invention will become more apparent by describing in detail preferred exemplary embodiments thereof with reference to the accompanying drawings, wherein:

FIG. 1 is a diagram illustrating a configuration of a power-line communication system according to a first embodiment of the invention;

FIGS. 9A to 9C are diagrams illustrating a structure of a noise detection packet in the power-line communication system according to the first embodiment of the invention;

FIG. 10 is a diagram illustrating another example of the noise detection packet transmission timing in the power-line communication system according to the first embodiment of the invention;

FIGS. 12A to 12C are diagrams illustrating another example of the tone map assigning process in the power-line communication system according to the first embodiment of the invention;

FIG. 25 is a diagram illustrating an example of a tone map assignment process in a conventional power-line communication system; and FIG. 26 is a diagram illustrating an influence of a change in state of a power line in the conventional power-line communication system.

100: PLC MODEM
100M: PLC MODEM (MASTER)
100T: PLC MODEM (SLAVE)
100T1~100TN: PLC MODEM (SLAVE)
101: CHASSIS
102: POWER CONNECTOR
103: MODULAR JACK
104: SWITCH
105: DISPLAY UNIT
200: CIRCUIT MODULE
210: MAIN IC
211: CPU
212: PLC MAC BLOCK
213: PLC PHY BLOCK
220: AFE IC
221: DA CONVERTER (DAC)
222: AD CONVERTER (ADC)
223: VARIABLE GAIN AMPLIFIER (VGA)
230: ETHERNET PHY IC
251: LOW-PASS FILTER
252: DRIVER IC
260: BAND-PASS FILTER
270: COUPLER
271: COIL TRANSFORMER
272a, 272b: COUPLING CAPACITOR
300: SWITCHING POWER SOURCE
400: POWER PLUG
500: SOCKET
600: POWER CABLE
900: POWER LINE
10: CONVERSION CONTROLLER
11: SYMBOL MAPPER
12: SERIAL-PARALLEL CONVERTER
13: INVERSE WAVELET TRANSFORMER
14: WAVELET TRANSFORMER
15: PARALLEL-SERIAL CONVERTER
16: DEMAPPER
1: AC POWER SOURCE

DETAILED DESCRIPTION

Hereinafter, embodiments of the invention will be described with reference to the accompanying drawings.

First Embodiment

FIG. 1 is a diagram schematically illustrating a configuration of a power-line communication system according to a first embodiment of the invention. The power-line communication system shown in FIG. 1 includes plural PLC (Power Line Communication) modems 100M, 100T1, 100T2, 100T3, . . . , 100TN connected to a power line 900. Five PLC modems are shown in FIG. 1, but the number of connected modems is arbitrary. The PLC modem 100M serves as a master terminal and serves to manage connection states (link states) of the PLC modems 100T1, . . . , 100TN serving as a slave terminal. However, the PLC modem serving as the master terminal is not essential.

In the following description, the master terminal and the specific slave terminals are described as the PLC modems 100M, 100T1, 100T2, 100T3, . . . , 100TN and a general slave terminal is described as the PLC modem 100T. The PLC modem not limited to the master terminal and the slave terminals is described simply as the PLC modem 100.

The power line 900 is shown as one line in FIG. 1, but two or more lines. The PLC modem 100 is connected to two lines.

Figure 2A:
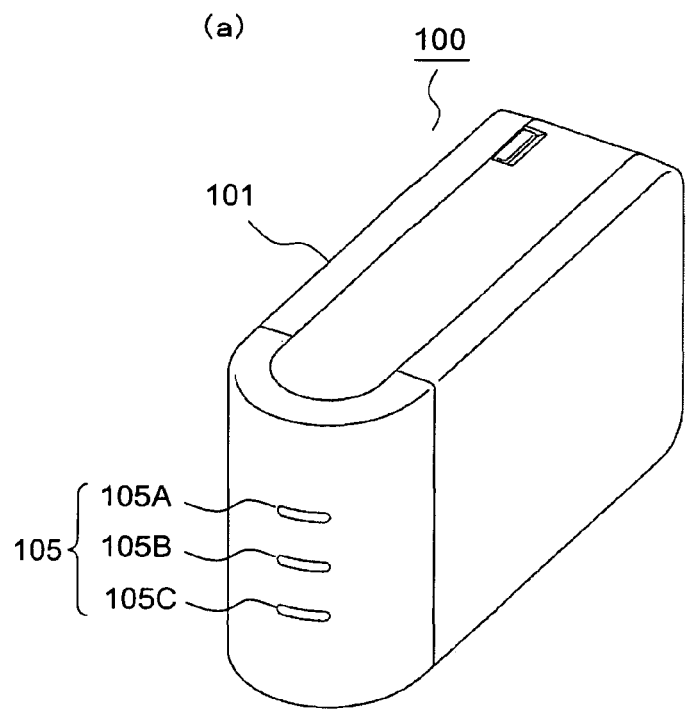
FIG. 2A is an outer appearance perspective view for representing a front plane of a PLC modem according to the first embodiment of the invention.
Figure 2B:
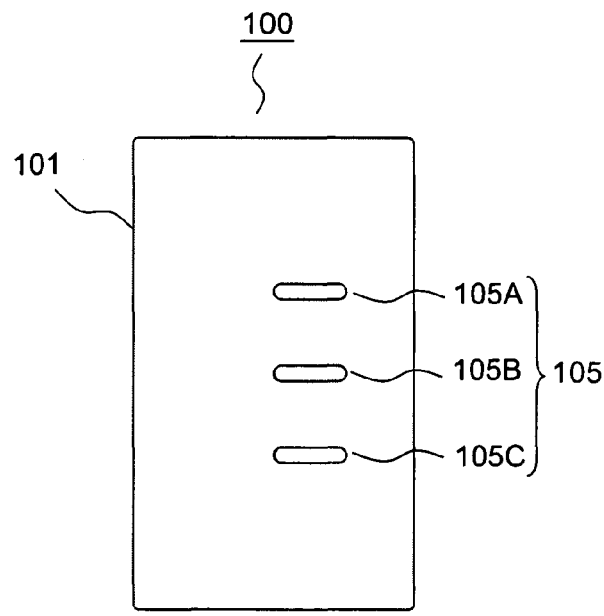
FIG. 2B is a front view of the PLC modem.
Figure 2C:
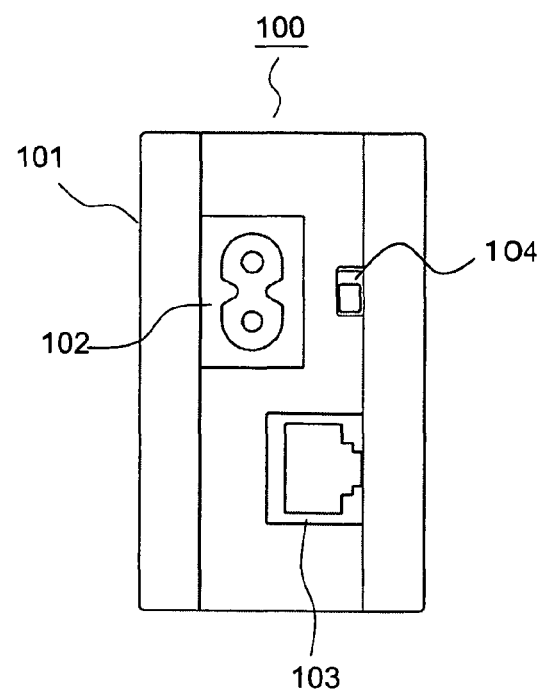
FIG. 2C is a rear view of the PLC modem.

FIGS. 2A to 2C are diagrams illustrating an appearance of the PLC modem 100, where FIG. 2A is an external perspective view illustrating the front side, FIG. 2B is a front view, and FIG. 2C is a rear view. The PLC modem 100 shown in FIG. 2 includes a chassis 101 and as shown in FIGS. 2A and 2B, a display unit 105 including LEDs (Light Emitting Diodes) 105A, 105B, and 105C is disposed in the front surface of the chassis 101. As shown in FIG. 2C, a power source connector 102, a LAN modular jack 103 such as a RJ45, and a switch 104 for switching an operation mode, etc. are disposed in the rear surface of the chassis 101. The power cable (not shown in FIG. 2) is connected to the power source connector 102 and a LAN cable (not shown in FIG. 2) is connected to the modular jack 103. The PLC modem 100 may further include a Dsub (D-Subminiature) connector for connection to a Dsub cable.

Figure 3:
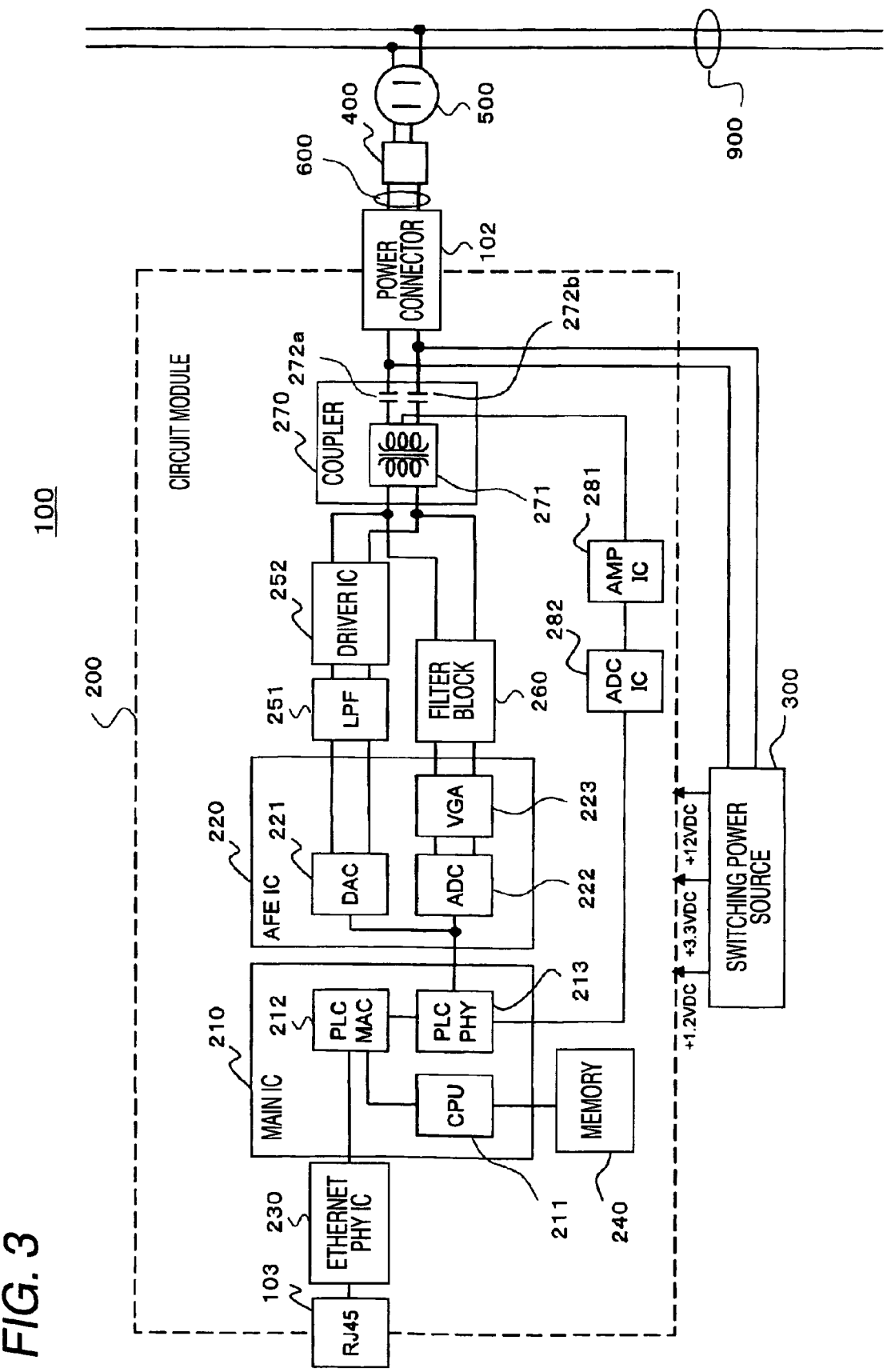
FIG. 3 is a diagram illustrating an example of the hardware of the PLC modem according to the first embodiment of the invention.

FIG. 3 is a block diagram illustrating an example of the hardware of the PLC modem 100. The PLC modem 100 includes a circuit module 200 and a switching power source 300 as shown in FIG. 3. The switching power source 300 serves to supply various voltages (for example, +1.2 V, +3.3 V, and +12 V) to the circuit module 200 and includes, for example, a switching transformer and DC-DC converter (which are not shown).

The circuit module 200 includes a main IC (Integrated Circuit) 210, an AFE IC (Analog Front End Integrated Circuit) 220, an Ethernet PHY IC (Physical Layer Integrated Circuit) 230, a memory 240, a low-pass filter (LPF) 251, a driver IC 252, a band-pass filter (BPF) 260, and a coupler 270. The switching power source 300 and the coupler 270 are connected to the power connector 102 and are connected to the power line 900 through a power cable 600, a power plug 400, and a socket 500. The main IC 210 serves as a control circuit for performing the power line communication.

The main IC 210 includes a CPU (Central Processing Unit) 211, a PLC MAC (Power Line Communication Media Access Control layer) block 212 and a PLC PHY (Power Line Communication Physical layer) block 213. The CPU 211 includes a 32-bit RISC (Reduced Instruction Set Computer) processor. The PLC MAC block 212 serves to manage a MAC layer of a transmission/reception signal and the PLC PHY block 213 serves to manage a PHY layer of the transmission/reception signal. The AFE IC 220 includes a DA converter (DAC) 221, an AD converter (ADC) 222, and a variable gain amplifier (VGA) 223. The coupler 270 includes a coil transformer 271 and coupling capacitors 272a and 272b. The CPU 211 controls the operations of the PLC MAC block 212 and the PLC PHY block 213 by the use of data stored in the memory 211 and also controls the entire operations of the PLC modem 100.

The communication using the PLC modem 100 is schematically performed as follows. Data input from the modular jack 103 ser sent to the main IC 210 through the Ethernet PHY IC 230 and a digital transmission signal is generated by performing a digital signal process. The generated digital transmission signal is converted into an analog signal by the DA converter (DAC) 221 of the AFE IC 220 and is output to the power line 900 through the low-pass filter 251, the driver IC 252, the coupler 270, the power connector 102, the power cable 600, the power plug 400, and the socket 500.

The signal received from the power line 900 is sent to the band-pass filter 260 through the coupler 270, the gain thereof is adjusted by the variable gain amplifier (VGA) 223 of the AFE IC 220, and then the resultant signal is converted into a digital signal by the AD converter (ADC) 222. The converted digital signal is sent to the main IC 210 and is converted into digital data by performing the digital signal process thereon. The converted digital data are output from the modular jack 103 through the Ethernet PHY IC 230.

An example of the digital signal process performed by the main IC 210 is described now. The PLC modem 100 makes multi-carrier communication using plural sub-carriers in an OFDM (Orthogonal Frequency Division Multiplexing) method, etc. The digital process of converting transmission data into an OFDM transmission signal and converting the OFDM reception signal into reception data is performed mainly by the PLC PHY block 213.

Figure 4:
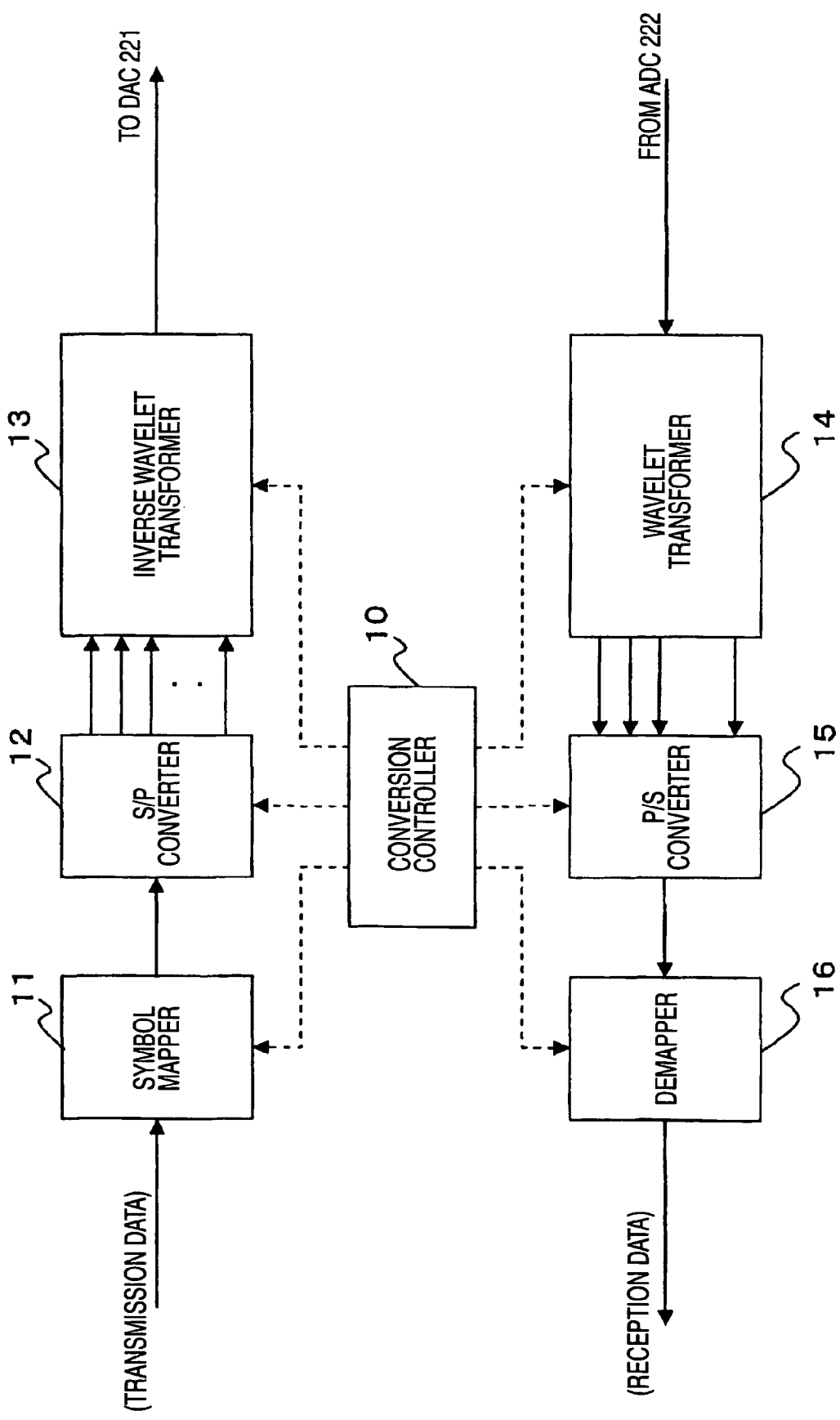
FIG. 4 is a diagram illustrating an example of a digital signal process in the PLC modem according to the first embodiment of the invention.

FIG. 4 is a functional block diagram illustrating an example of the digital signal process performed by the PLC PHY block 213, where an OFDM transmission using a wavelet transform is performed. As shown in FIG. 4, the PLC PHY block 213 serves as a conversion controller 10, a symbol mapper 11, a serial-parallel converter (S/P converter) 12, an inverse wavelet transformer 13, and wavelet transformer 14, a parallel-serial converter (P/S converter) 15, and a demapper 16.

The symbol mapper 14 serves to convert bit data to be transmitted into symbol data by the number of bits which can be transmitted with a symbol to be described and to perform a symbol mapping (for example, PAM modulation) on the basis of the symbol data. The S/P converter 12 serves t convert mapped serial data into parallel data. The inverse wavelet transformer 13 serves to inverse-wavelet transform parallel data into data in a time axis and to generate a series of sample values indicating transmission symbols. The data are sent to the DA converter (DAC) 221 of the AFE IC 220.

The wavelet transformer 14 serves to discrete-wavelet transform the received digital data (a series of sample values sampled at the same sample rate as transmission) obtained from the AD converter (ADC) 222 of the AFE IC 220 into a value on a frequency axis. The P/S converter 15 serves to convert parallel data on the frequency axis into serial data. The demapper 16 serves to acquire reception data by calculating amplitudes of sub carriers and determining the reception signal.

Figure 5:
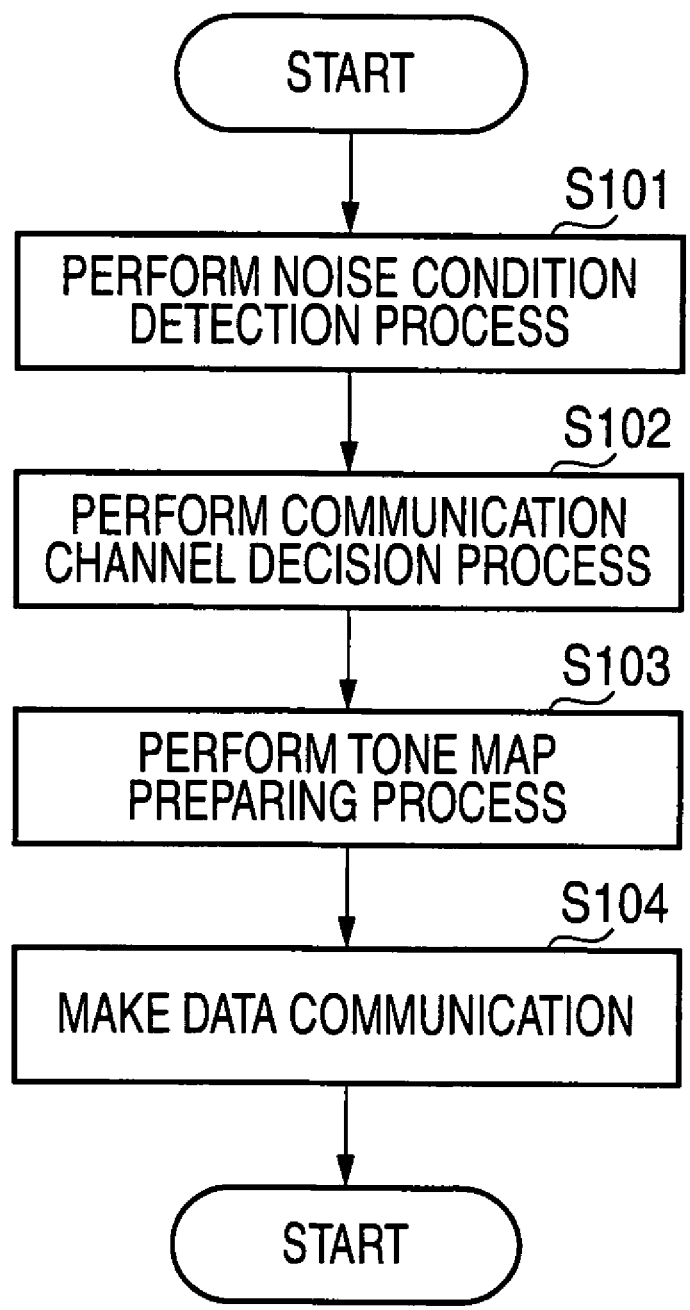
FIG. 5 is a diagram schematically illustrating an operation flow of the power-line communication system according to the first embodiment of the invention.

FIG. 5 is a flow diagram schematically illustrating operations including a tone map preparation operation in the power-line communication system according to the embodiment of the invention. In step S101, a noise detection process is performed. This process is performed by transmitting a packet for detecting a noise condition in the communication medium from a transmission-side PLC modem to a reception-side PLC modem and detecting the noise condition on the basis of a reception state of the packet received by the reception-side PLC modem.

Figure 6:
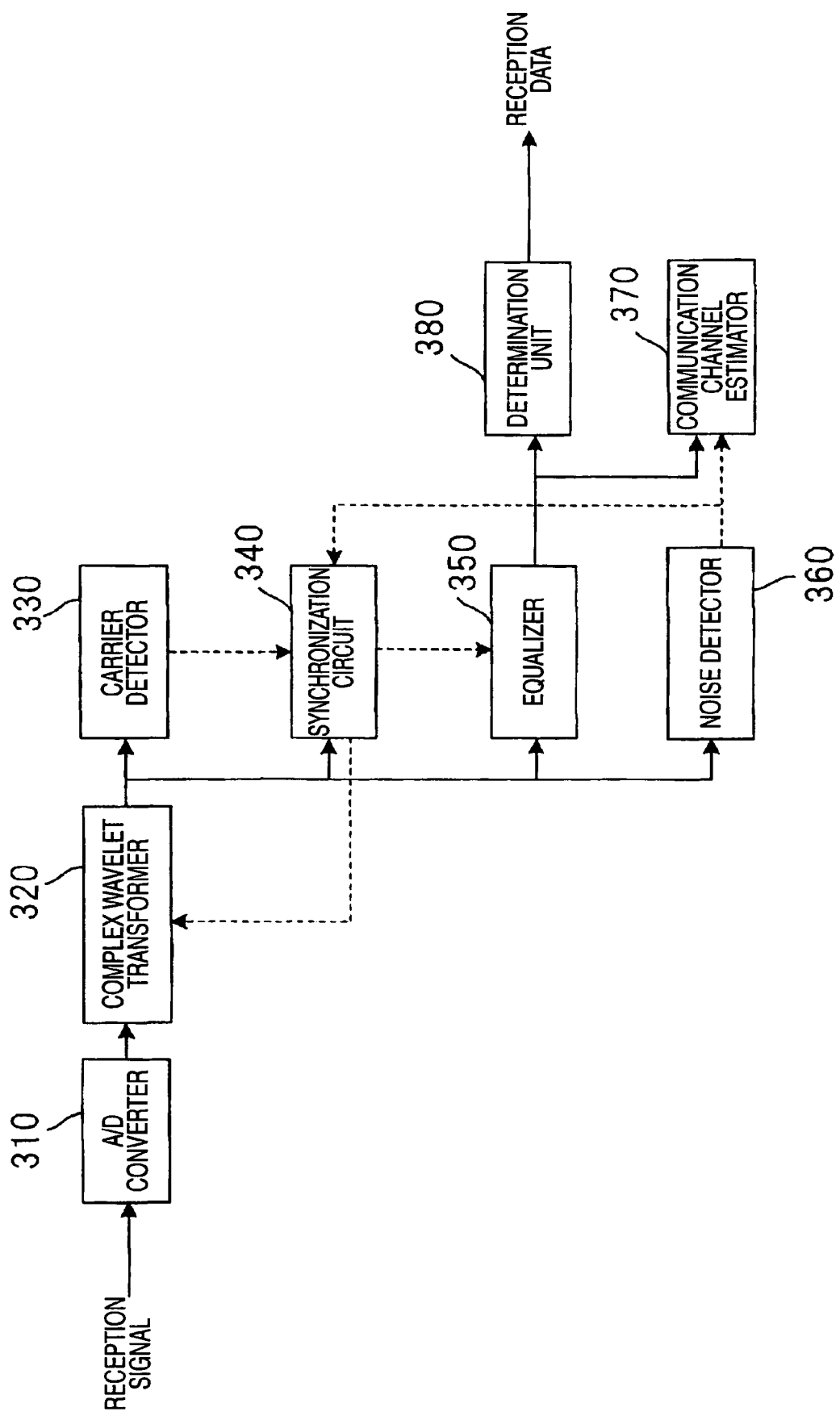
FIG. 6 is a block diagram illustrating a reception unit of a reception-side PLC modem according to the first embodiment of the invention.

First, a communication channel estimation process is described. FIG. 6 is a block diagram illustrating a reception unit of the reception-side PLC modem according to the first embodiment of the invention.

In FIG. 6, reference numeral 310 represents an A/D converter converting an analog signal into a digital signal, reference numeral 320 represents a complex wavelet transformer generating an in-phase signal and an orthogonal signal by wavelet-transforming a reception signal, reference numeral 330 represents a carrier detector detecting a transmission signal sent from a transmitting device, reference numeral 340 represents a synchronization circuit synchronizing a signal with the reception signal, reference numeral 350 represents an equalizer 360 correcting a signal distorted due to the influence of the communication medium to which electric instruments connect, reference numeral 360 represents a noise detector detecting a narrow-band noise in sub-carrier bands using the signal obtained from the complex wavelet transform, reference numeral 370 represents a communication channel estimator determining a primary modulation method used in the sub-carriers of a symbol mapper of the transmitting device using the signal output from the equalizer 350 and the noise information of the communication medium, and reference numeral 380 represents a determination unit making determination using the signal output from the equalizer 350. The noise detector 360 may be omitted.

Here, the A/D converter 310 corresponds to the ADC 222, and the complex wavelet transformer 320, the carrier detector 330, the synchronization circuit 340, the equalizer 350, the noise detector 360, the communication channel estimator 370, and the determination unit 380 corresponds to the main IC including the PLC PHY 213 and the CPU 211.

Figure 7:
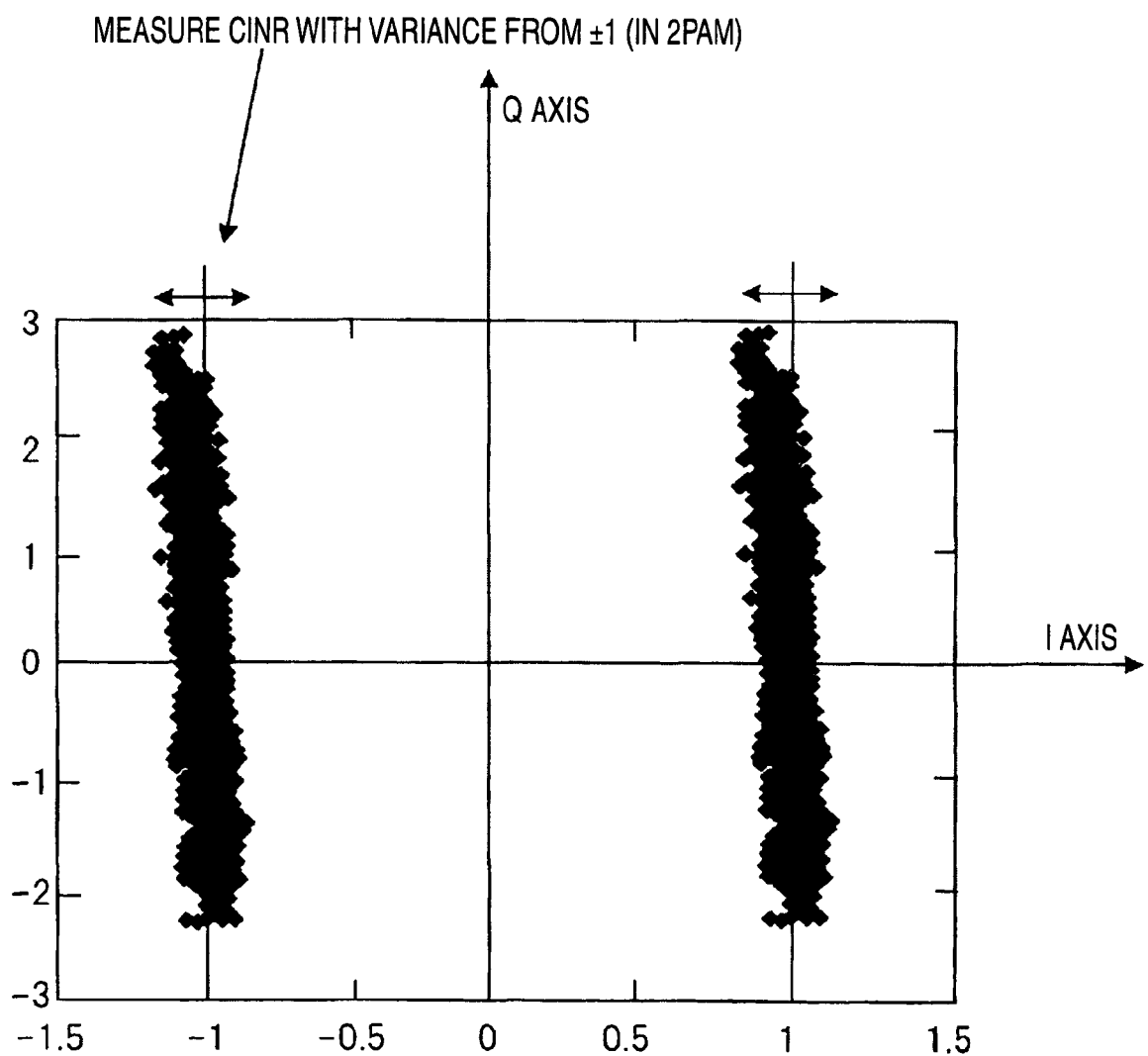
FIG. 7 is a diagram illustrating a scatter of an equalizer output signal according to the first embodiment of the invention.

Operations of a receiving device having the above-mentioned configuration are described now with reference to FIGS. 6 and 7.

FIG. 7 is a diagram illustrating a scatter of the signal output from the equalizer.

In FIG. 6, the A/D converter 310 converts the reception signal from an analog signal into a digital signal, the complex wavelet transformer 320 transforms the received digital signal in a wavelet manner, the carrier detector 330 detects the signal sent from the transmitting device, the synchronization circuit 340 adjusts a wavelet transform time of the complex wavelet transformer 320 so as to be synchronized with the reception signal using a preamble signal, the equalizer 350 removes the influence of the communication medium, the noise detector 360 detects a narrow-band noise existing in the used band, the communication channel estimator 370 estimates the condition in the communication medium and determines a primary modulation method of the symbol mapper used in the transmitting device, and the determination unit 380 makes determines using the signal output from the equalizer 350.

FIG. 7 shows a scatter of the output from the equalizer (corresponding to the entire sub-carriers) of the receiving device when the entire sub-carriers 2PAM are selected by the symbol mapper of the transmitting device. In general, when the communication channel is estimated, a known frame (which will be described later) for estimating the communication channel is transmitted from the transmitting device and the communication channel estimator 370 of the receiving device measures a CINR (carrier to (interference+noise) ratio) using a variance in a signal point arrangement (±1 in 2PAM) as an amount of noise. The primary modulation method (for example, 16PAM or 8PAM) used in the sub-carriers is selected using the CINR measured in the sub-carriers and is informed to the transmitting device. This is a communication channel estimation process usually performed by the transmitting and receiving devices.

A tone map has a modulation method, an error correction, etc. recorded therein by time and by frequencies. In the tone map, communication rates (amount of bits per sub-carrier) determined depending on the primary modulation of the respective sub-carriers are correlated with the sub-carriers.

Data transmitted and received in the communication channel estimation process are predetermined bit data in the transmission-side PLC modem and the reception-side PLC modem. For example, the bit data can employ a part of an M-sequence random number series. The data for estimating the communication channel are transmitted using a predetermined modulation method (for example, ALL 2PAM). At this time, the minimum unit for calculating the CINR of the sub-carriers is a symbol, and the tone maps of each symbol can be prepared by comparing a predetermined threshold value with the CINR of the respective sub-carriers in one symbol. By comparing another predetermined threshold value with an average value of the CINR of the sub-carriers in plural symbols, the tone maps of the plural symbols may be prepared.

Since the frame including plural symbols includes a symbol series including predetermined random number series in the transmission side and the reception side, the communication channel estimating frame is also known to the transmission side and the reception side. By using the determination signal obtained from the determination unit of the reception side as a known signal, the bit data need not be predetermined by the transmission-side PLC modem and the reception-side PLC modem in advance.

Figure 8A:
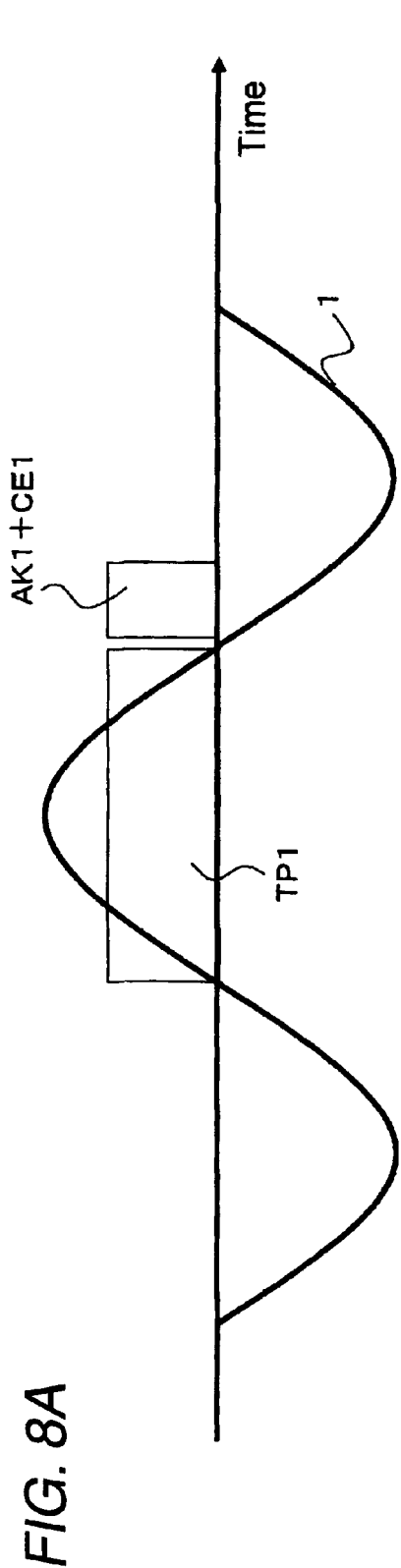
FIGS. 8A to 8C are diagrams illustrating an example of a noise detection packet transmission timing in the power-line communication system according to the first embodiment of the invention.
Figure 8B:
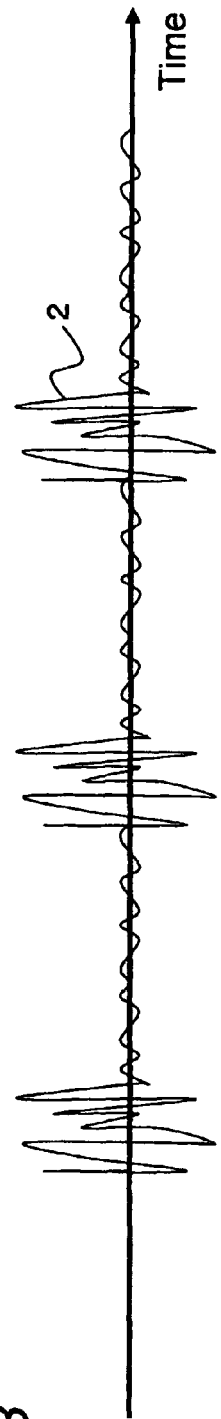
Figure 8C:
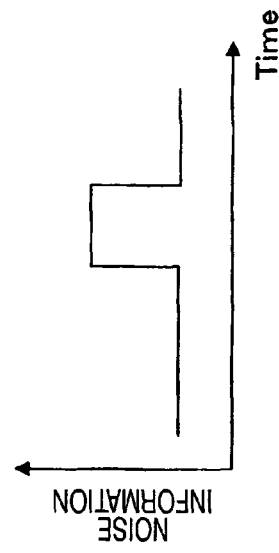

FIG. 8A shows an example of a noise detection packet transmission timing. As shown in FIG. 8A, the noise detection packet TP1 has a length (for example, 8.3 ms) corresponding to a half cycle of the AC power source 1 in which plural symbols are continuous. Subsequently to the noise detection packet TP1, a packet AK1+CE1 including the acknowledgment (Ack) from the reception-side PLC modem and a tone map as the communication channel estimation (CE (Channel Estimation)) result is transmitted. The CE result indicates the noise detection result detected on the basis of the reception state of the packet in the noise detection packet transmission step and also indicates a position of the noise or a segment in which the environment of the communication channel greatly varies due to the noise. By measuring variation such as a variation in ratio of carrier power to (interference power plus noise power) or ratio of signal to noise (signal to noise ratio (SNR)) or a variation in the number of errors (error rate) or the number of re-transmission times or re-transmission rate of transmission data, the CE result may indicate the position of the noise or a segment in which the environment of the communication channel greatly varies due to the noise. With the noise level shown in FIG. 8B, the CE result is shown, for example, in FIG. 8C. In FIG. 8C, the noise information is expressed by two values, but not limited to two values. The Ack and the CE result are transmitted by the same packet, but may be transmitted by individual packets. When they are transmitted by individual packets, the individual packets include an Ack packet in response to packet TP1, a CE result packet, and an Ack packet in response to the CE result packet.

Packet TP1 has a structure shown, for example, in FIGS. 9A to 9C. In FIGS. 9A to 9C, the horizontal axis represents time axis and the vertical axis represents frequency (or carrier number). In FIGS. 9A and 9B, predetermined data (for example, known symbol data SY) for detecting the noise condition of the communication channel are transmitted subsequently to the header. FIG. 9A shows a packet transmitting pilot carriers PC1 by predetermined frequencies and the packet transmitting known symbol data by the other frequencies. FIG. 9B shows a packet transmitting a pilot symbol PS1 every predetermined period of time and the packet transmitting known symbol data in the other period of time. In this way, by inserting the pilot carrier PC1 or the pilot symbol PS1, the synchronization between the transmission side and reception side can recovers fast from un-synchronization due to the noise or the like. Accordingly, this is particularly effective when the long packet is transmitted as shown in FIG. 8A. Packet TP1 having a length corresponding to a half cycle of the AC power source 1 is used in FIG. 8A, but the length may correspond to the entire cycle of the AC power source 1.

Packet TP1 may not be an exclusive packet for transmitting the known symbol data for detecting the noise of the communication channel. Usually data may be transmitted and an error occurring period of time may be detected. In this case, the pilot carrier or the pilot symbol may be inserted.

In packet PT1 shown in FIG. 9C, the payload of the packet subsequent to the header is divided into blocks PB11 to PB16. The blocks, for example, include blocks (an Reed-solomon (RS) block, a Turbo block, and an Low-density parity-check code (LDPC) block) using an FEC (Forward Error Correction) as a unit and blocks (a symbol block or a fragment block) using which are process units in PHY or MAC. In this case, an error or an average SNR is detected in the unit of blocks. In the packet, a preamble PR and frame control data FC are added to the header. When the error detection result (the noise condition) in the unit of blocks are expressed in two values of "1" or "0" by comparing a predetermined threshold value and the error detection result, the burden for transmitting the detection result is reduced.

FIGS. 10A to 10D show another example of the noise detection packet transmission timing. As shown in FIG. 10A, the noise detection packets TP21 to TP23 have a length (for example, 1 ms) smaller than the half cycle of the AC power source 1. The plural packets are transmitted to cover the entire half cycle of the AC power source 1. In FIG. 10A, three packets TP21 to TP23 cover the half cycle of the AC power source 1. Ack packets AK21 and AK22 are transmitted subsequent to TP21 and TP22, and packet AK23+CE2 is transmitted subsequent to TP23. Here, AK21 corresponding to TP21 is an example where the noise information is divided and sent in the first half and the second half of TP2. Packet AK23+CE2 is the same as AK1+CE1 shown in FIG. 8A and thus description thereof is omitted.

With the noise level shown in FIG. 10B, the CE result is shown, for example, in FIG. 10C. In FIG. 10C, the noise information is expressed by three values, but is not limited to three values and may be expressed by two values similarly to FIG. 8C.

In this way, when short packets TP21 to TP23 shorter than the half cycle of the AC power are used, as shown in FIG. 10A, the short packets TP21 to TP23 may be transmitted at a constant interval in synchronization with the half cycle of the AC power. However, as long as the half cycle of the AC power source is covered, all the packets need not be transmitted for the same half cycle. In FIG. 10A, the short packets TP21 to TP23 do not cover very short times of the half cycle of the AC power due to the Ack packets AK21 and AK22. The slight gaps can be interpolated on the basis of the states of the prior or posterior periods of time and thus cause no problem. The half cycle of the AC power source 1 is covered in FIG. 10A, but the entire cycle of the AC power source 1 may be covered as shown in FIG. 10D.

Here, the packets TP21 to TP23 to be transmitted may not be exclusive packets for transmitting known random data for detection of the noise of the communication channel. The period of time when data depart may be detected by transmitting usual data. In this case, the pilot carrier or the pilot symbol may be inserted.

Referring to FIG. 5 again, in step S102, a communication channel decision process of generating communication channels is performed on the basis of the noise condition detected in step S101. This process is performed by the transmission-side PLC modem after the noise condition detected by the reception-side PLC modem is transmitted to the transmission-side PLC modem.

Figure 11A:
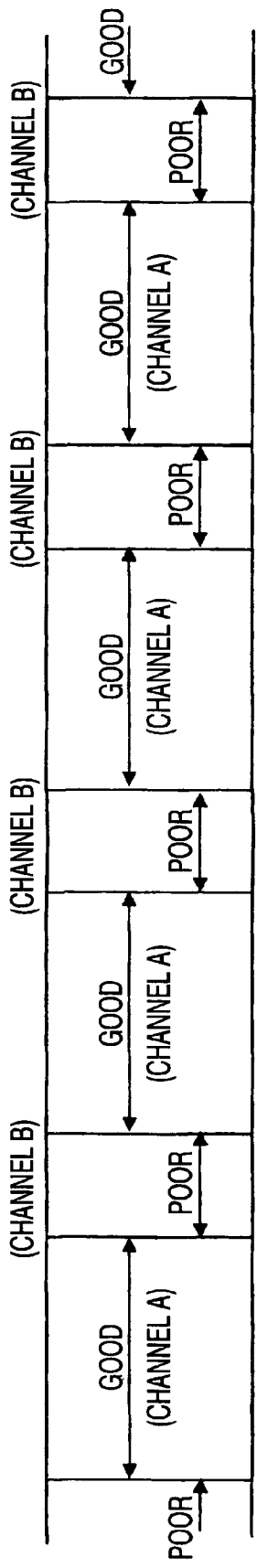
FIGS. 11A to 11C are diagrams illustrating an example of a tone map assigning process in the power-line communication system according to the first embodiment of the invention.
Figure 11B:
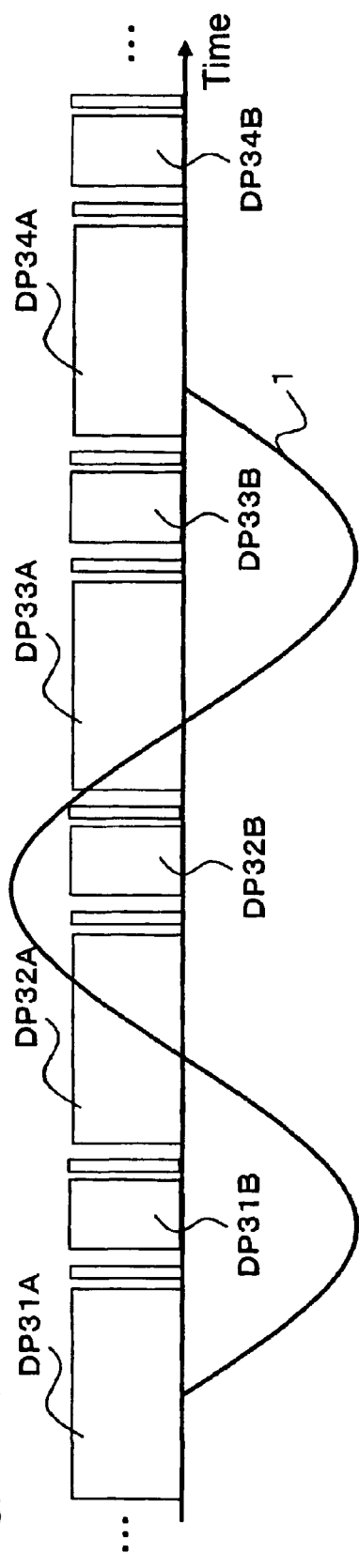
Figure 11C:
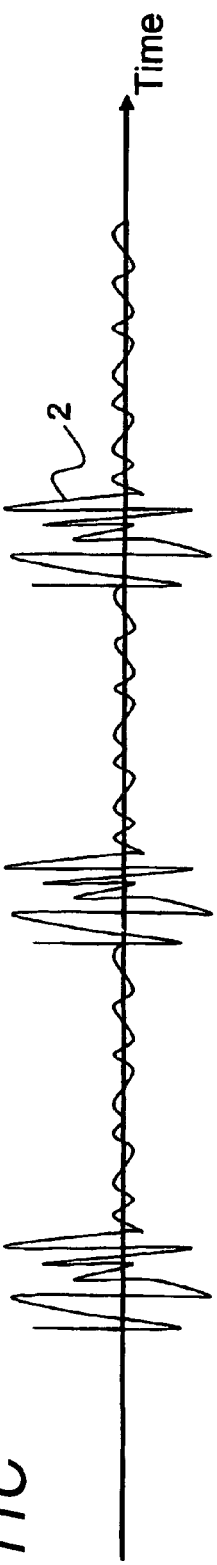

In step S103, the tone maps of the communication channels generated in step S102 are prepared. FIG. 11A shows an example of assignment of the channels and tone maps. With the noise level shown in FIG. 11C, as shown in FIG. 11A, channel A is assigned to segments having a good noise condition and channel B is assigned to segments having no good noise condition. Packets DP31A to DP34A and packets DP31B to DP34B are prepared in the segments, respectively. Here, for example, when the CINR is equal to or greater than a predetermined threshold value, channel A is determined on the basis of the noise condition of each symbol data SY which is the minimum unit indicating a segment. Similarly, when the CINR is less than the predetermined threshold value, channel B is determined on the basis of the noise condition of each symbol data SY.

Subsequently, the tone maps are prepared to correspond to the packets. FIGS. 12A to 12C show another example of assignment of the channels and tone maps. The example shown in FIGS. 12A to 12C are similar to the example shown in FIGS. 11A to 11C, except that one packet is assigned to channel A in FIG. 11B but two packets are assigned to channel A in FIG. 12B.

When the preparation of the tone maps is ended, the tone maps are transmitted to a destination PLC modem and data are transmitted between the transmission-side PLC modem and the reception-side PLC modem using the same tone maps (step S1 04).

Figure 13:
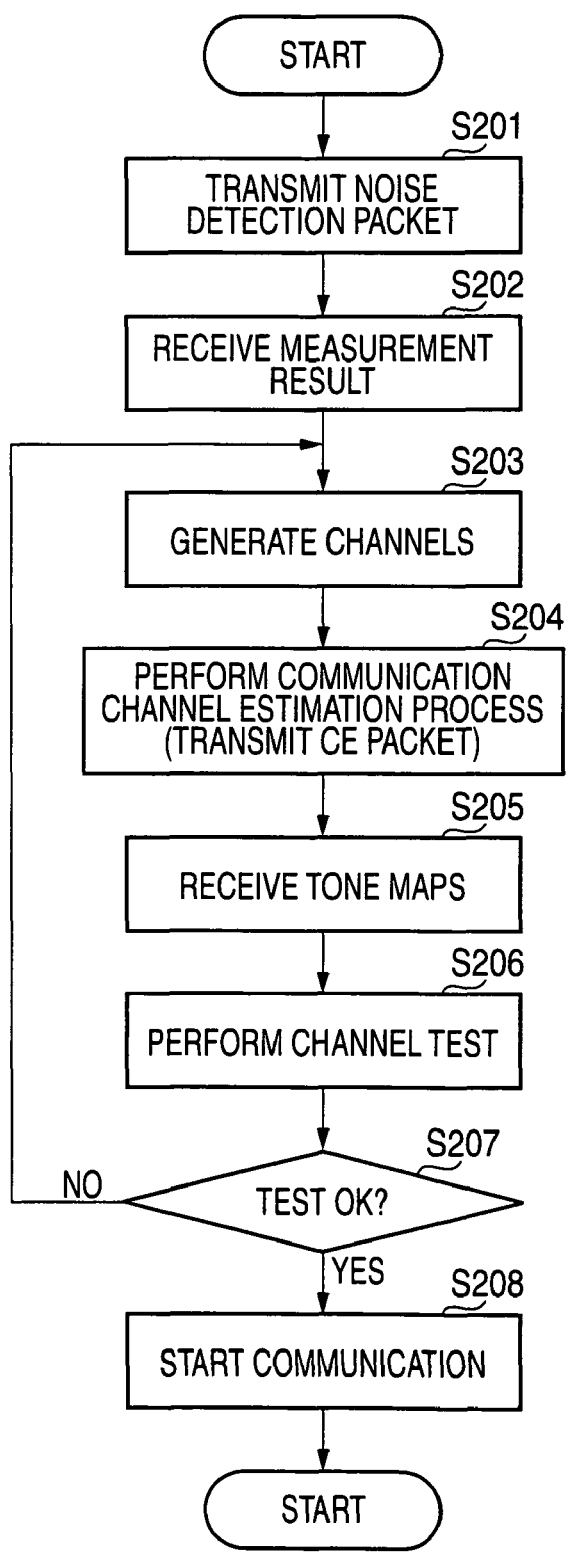
FIG. 13 is a flow diagram illustrating an example of an operation of a transmission-side power-line communication device in the power-line communication system according to the first embodiment of the invention.
Figure 14:
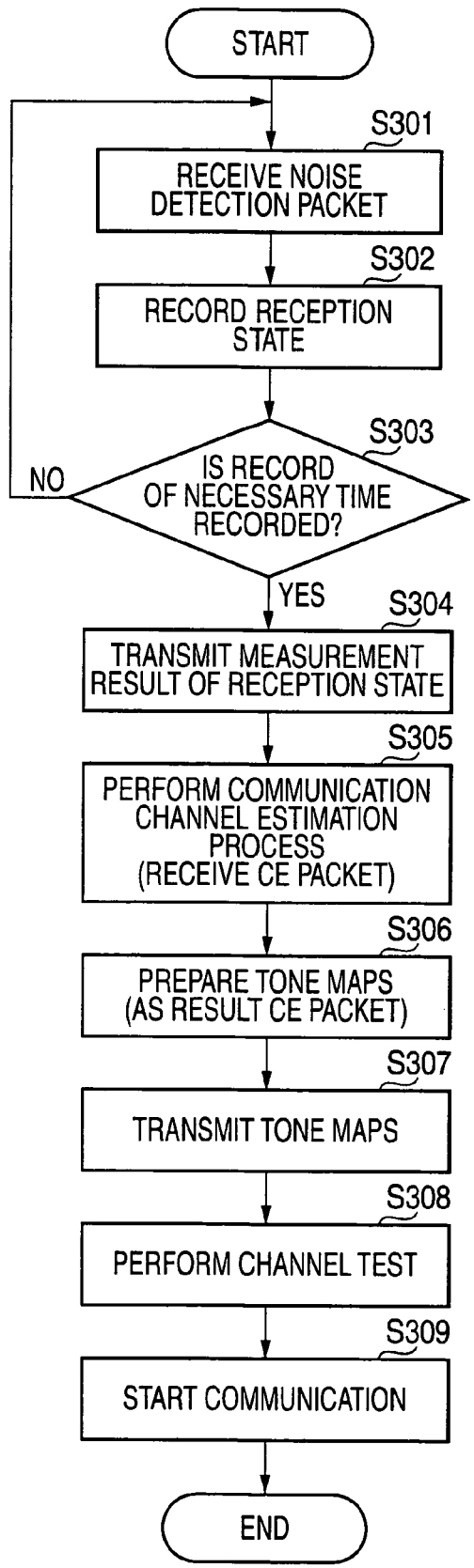
FIG. 14 is a flow diagram illustrating an example of an operation of a reception-side power-line communication device in the power-line communication system according to the first embodiment of the invention.

FIG. 13 shows an example of operations of the transmission-side power-line communication (PLC) device in the power-line communication system according to the first embodiment of the invention and FIG. 14 shows an example of operations of the reception-side power-line communication (PLC) device in the power-line communication device according to the first embodiment of the invention. The operations are performed by the main IC 210 shown in FIG. 3.

In step S201, a noise detection packet is transmitted to another power-line communication device to communicate therewith. The noise detection packet has the structure shown in FIGS. 9A to 9C and is transmitted at the times shown in FIG. 8A or 10.

Referring to FIG. 14, when the noise detection packet is received in step S301, the reception state of the packet is recorded (step S302). Then, it is determined whether the reception states of a necessary period of time (at least a half cycle of the AC power source) are recorded (step S303). When the reception states of the necessary period of time are recorded, the process of step S304 is performed. When the reception states are not recorded, the process of step S301 and the processes subsequent thereto are repeatedly performed.

In step S304, the measurement result of the reception state is transmitted to the PLC device having transmitted the noise detection packet.

Referring to FIG. 13, in step S202, the noise detection result is received from another power-line communication device to communicate with. Then, in step S203, the communication channels in the communication media are generated using the received noise condition. In this case, when the width of the channels obtained from the noise condition is smaller than a predetermined width, the segment is not used for the communication.

Next, a communication channel estimation process of detecting the condition in the communication medium with a communication opponent is performed in step S204 and in step S305 shown in FIG. 14. Specifically, the CE packet is transmitted to the reception PLC device, and the reception-side PLC device having received the CE packet estimates the communication channels on the basis of the reception state. Then, the tone map is prepared for each channel on the basis of the communication channel estimated state (CE result) of the communication medium (step S306). The tone maps include a modulation method, an error correction, and the like by time and by frequencies. Subsequently, in step S307, the prepared tone maps are transmitted to the transmission-side PLC device.

The transmission-side PLC device receives the tone maps in step S205 shown in FIG. 13 and performs the channel test in step S206 and in step S308 shown in FIG. 14. The channel test is to determine whether the previously constructed channels are proper. For example, the determination is reciprocally performed by comparing the variation of the re-transmission rate or the number of errors with a predetermined threshold value. When the test result is OK (step S207), the communication is started using the prepared tone maps (step S208). Similarly, the reception-side PLC device also starts the communication (step S309). When the test result is not OK, the channels are generated again in step S203.

The channel test of steps S206 and S308 is not essential and may be omitted.

Figure 15:
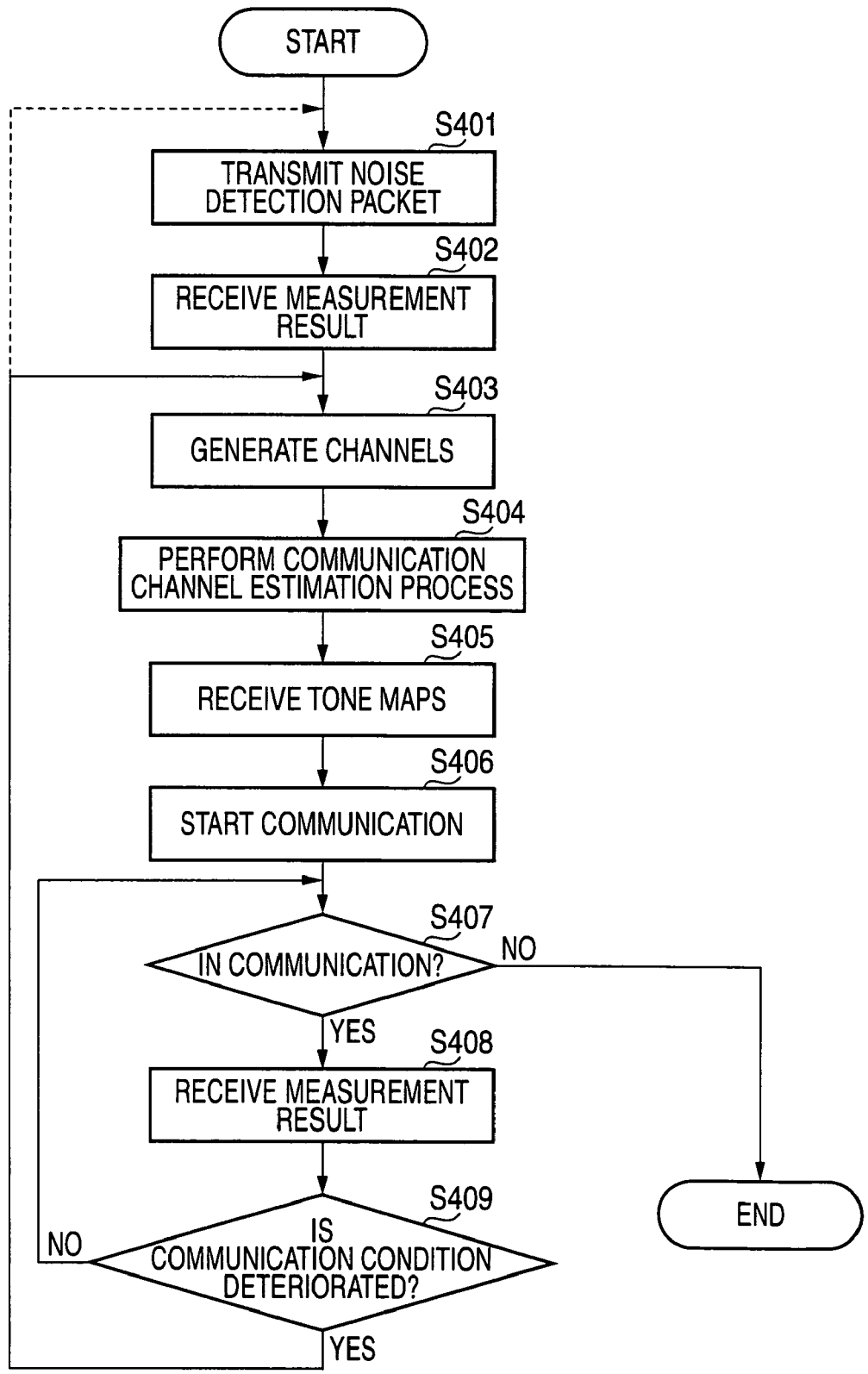
FIG. 15 is a flow diagram illustrating another example of an operation of the transmission-side power-line communication device in the power-line communication system according to the first embodiment of the invention.

FIG. 15 shows another example of operations of the transmission-side power-line communication device in the power-line communication system according to the first embodiment of the invention. In this example, the noise detection process or the channel decision process is performed again depending on the condition (variation) in the communication medium after the communication is started.

The processes of steps S401 to S405 are the same as steps S201 to S205 shown in FIG. 13 and thus description thereof is omitted. Since the channel test is omitted in FIG. 15, the communication is started in step S406 (the channel test may not be performed). Then, it is determined in step S407 whether it is in communication with a different PLC device. When it is not in communication, the procedure is stopped.

When it is in communication, the measurement result of the condition in the communication medium is received from the transmission-side PLC device (step S408). The received measurement result indicates whether the condition in the communication medium varies using the re-transmission rate or the error rate, the number of errors, and the variation in SNR or the variance. When the deterioration in state is not determined as the received measurement result, the communication is continued in step S407.

When the communication condition is bad in step S409, the channel decision process or the noise detection process is performed. When the channel decision process is performed again, the process of step S403 and the processes subsequent thereto are performed again. Then, new channels are generated and the tone maps thereof are prepared. When the noise detection process is performed again, the noise detection packet is transmitted again in step S401. Then, the noise detection result is received and the processes of generating new channels and preparing tone maps are performed.

Figure 16:
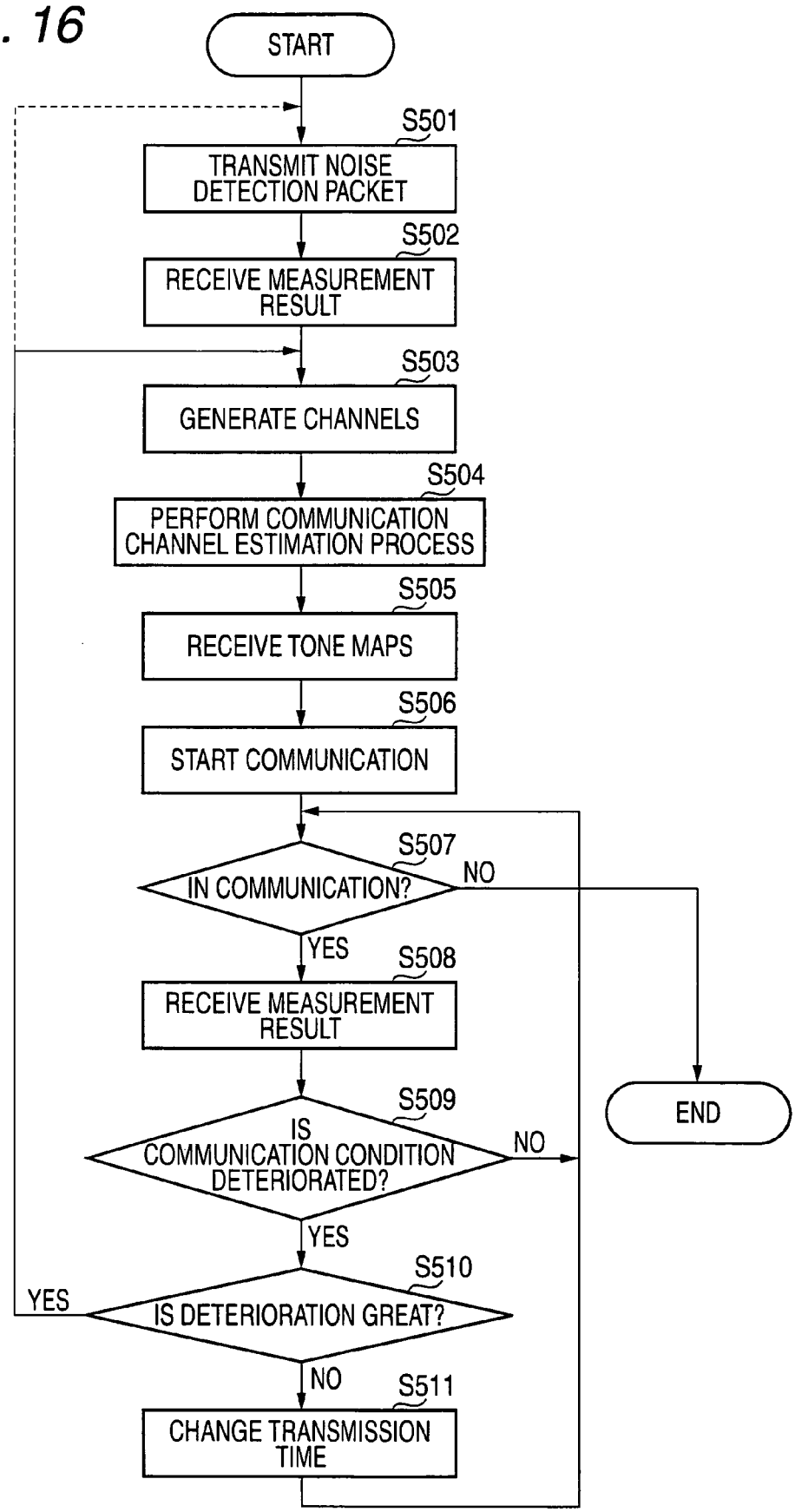
FIG. 16 is a flow diagram illustrating still another example of an operation of the transmission-side power-line communication device in the power-line communication system according to the first embodiment of the invention.

FIG. 16 shows an example of operations of the transmission-side power-line communication device in the power-line communication system according to the first embodiment of the invention. In this example, when the variation in state of the communication medium is detected and it is detected in the step that the condition in the communication medium varies more than a predetermined value, the transmission time of the transmission packet with respect to the power source period in the communication step is changed. The change in time may be performed along with the noise detection process or the channel decision process.

The processes of steps S501 to S508 in FIG. 16 are the same as steps S401 to S408 in FIG. 15 and thus description thereof is omitted. The received measurement result is determined by two steps. When it is determined in step S509 that the communication condition is deteriorated, it is further determined in step S510 how bad the condition is. When no deterioration is caused, the communication is continued in step S507. When the communication condition is bad than the threshold of step S510, the noise detection process (step S501) or the channel decision process (step S503) is performed similarly to FIG. 15. When the communication state is deteriorated but the deterioration is small, the packet transmission timing of transmission data is changed (or the length of the packet is reduced) in step S511.

The change in transmission or the reduction in packet length causes the determination that the range of noise is moved or enlarged due to the deterioration in communication state, whereby it is intended to transmit the packet at the time for avoiding the noise.

When the degree of deterioration is small and the deterioration exists after changing the transmission time, the noise detection process or the channel decision process may be performed again in step S501 or S503.

In the above-mentioned power-line communication system, the communication channels are generated by the transmission-side power-line communication device and the tone maps are prepared by the reception-side power-line communication device. However, the communication channel decision process and the tone map preparation process may be performed by any one of the transmission-side PLC device and the reception-side PLC device. One thereof may perform both of the communication channel decision process and the tone map preparation process.

Figure 17A:
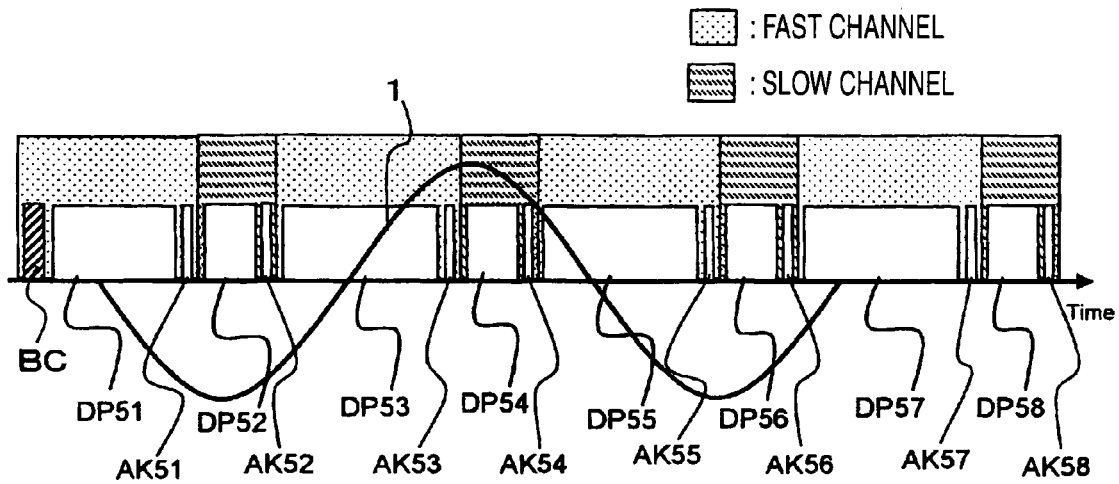
FIGS. 17A to 17C are diagrams illustrating a beacon transmission time in the power-line communication system according to the first embodiment of the invention.
Figure 17B:

In power-line communication, a beacon may be transmitted from a PLC device serving as a master terminal. The beacon should be necessarily received by all the PLC devices. FIG. 17A shows a beacon transmission time in the power-line communication system according to the first embodiment of the invention. In FIG. 17A, a beacon BC is transmitted using a channel having a high communication rate among the channels (channels having high communication rates and channels having low communication rates) generated between the master PLC device and a specific slave PLC device), and packets DP51 to DP58 and Ack packets AK51 to AK58 corresponding to the other period of time and the rate of the channel are inserted. When the beacon is transmitted to all the slave PLC devices at the time corresponding to the fast channel, the beacon can be reliably used by the slave terminals.

Figure 17C:
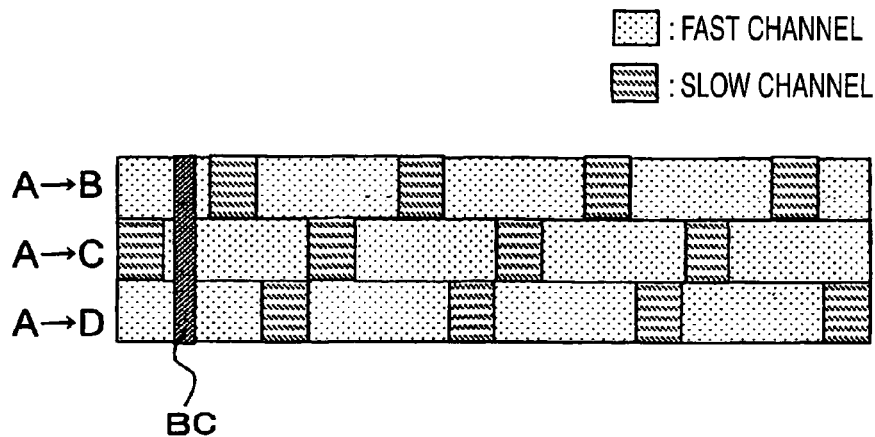

FIG. 17C shows a communication rate from the master PLCA 100M to the slave PCLB 100T1, a communication rate from the master PLCA 100M to the slave PLCC 100T2, and a communication rate from the master PLCA 100M to the slave PLCD 100T3. The communication rate of the channel from the master PLCA to the slave PLCB is expressed by A-->B, the communication rate of the channel from the master PLCA to the slave PLCC is expressed by A-->C, and the communication rate of the channel from the master PLCA to the slave PLCD is expressed by A-->D. When the communication rates of the channels are not constant, it is necessary to transmit the beacon at the times shown in the figure. In FIG. 17C, the beacon is transmitted in the segments in which the channels having high communication rates can be secured among the segments from the master PLCA to the slave PLCB, from the master PLCA to the slave PLCC, and from the master PLCA to the slave PLCD.

A beacon management unit embodied by the main IC 210 shown in FIG. 3 includes a beacon transmission portion determining the beacon transmission time and determines the beacon transmission time as follows. That is, the beacon transmission time is determined using the communication channels with all the other PLC devices.

Figure 18:
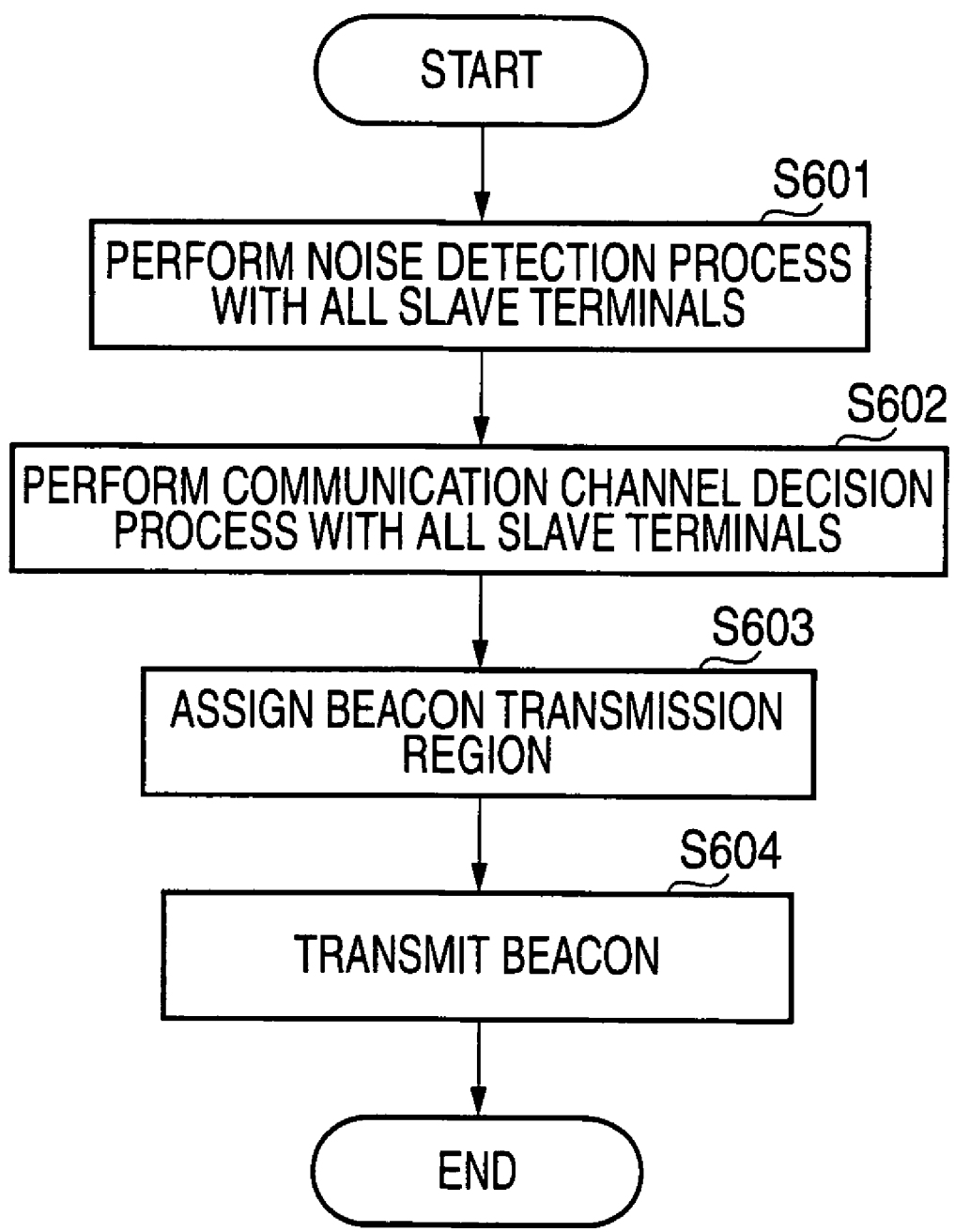
FIG. 18 is a flow diagram illustrating a beacon transmission operation in the power-line communication system according to the first embodiment of the invention.

FIG. 18 is a flow diagram illustrating a beacon transmission operation in the power-line communication system according to the first embodiment of the invention. In step S601, the noise detection process is performed on the communication channels with all the slave PLC devices. This process is the same as step S101 in FIG. 5. Subsequently, the communication channels with all the slave PLC devices are decided on the basis of the detected noise condition (step S602). This process is also the same as step S102 in FIG. 5.

At this time, since the states of the communication channels shown in FIG. 17C can be grasped, a region in which the beacon can be transmitted to all the slave PLC devices is assigned as a beacon transmission region (step S603). Then, in the beacon transmission region with a predetermined time interval, the beacon is transmitted (step S604). By transmitting the beacon in this way, the beacon can be transmitted reliably to the slave terminals.

Figure 19:
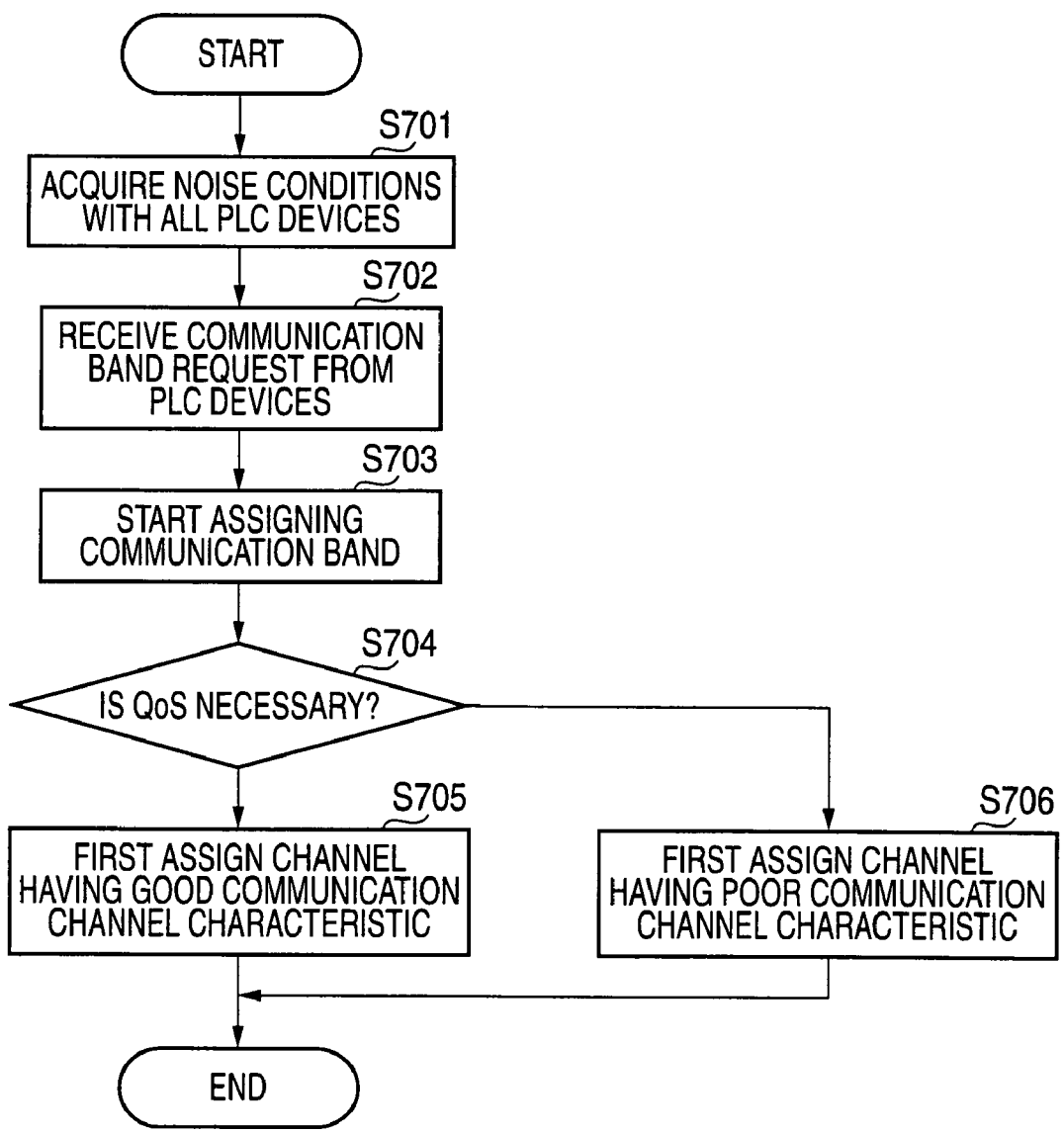
FIG. 19 is a flow diagram illustrating a communication band intensive management operation in the power-line communication system according to the first embodiment of the invention.

FIG. 19 is a flow diagram illustrating an operation of intensively managing the communication bands in the power-line communication system according to the first embodiment of the invention. In this example, a TDMA control in an intensive control system is performed by the master PLC device. All the PLC devices constituting the power-line communication system detect the noise condition corresponding to the power source period of the communication medium with all the other PLC devices.

The master PLC device detects the states of noise grasped by the other PLC devices in step S701. Specifically, the master PLC device detects the communication conditions (such as communication rates in the actual communication mediums) between the slave terminals and between the master terminal and the slave terminals. When a communication band request is received from a specific PLC device in step S702, the assignment of the communication bands is started (step S703).

Then, in step S704, it is determined whether it is a traffic such as a VoIP or a stream requiring the QoS. When the QoS is required, a channel having an excellent communication medium characteristic is first assigned thereto (step S705). A channel having a poor communication medium characteristic is first assigned to a traffic not requiring the QoS. By performing the channel assignment in this way, it is possible to efficiently transmit data as a whole of the system.

Although the wavelet OFDM modulation and demodulation of performing the inverse wavelet transform in transmission and performing the wavelet transform in reception has been described in this embodiment, the same process may be performed by the use of the FFT OFDM modulation and demodulation of performing an inverse Fourier transform in transmission and performing a Fourier transform in reception.

Second Embodiment

In the power-line communication system according to the first embodiment described above, the noise condition in the communication medium has been detected regardless of the communication slot. On the contrary, in a power-line communication system according to a second embodiment of the invention, the noise condition is detected in the unit of slots synchronized with the cycle of the AC power source. The power-line communication system according to the second embodiment is different from the power-line communication system according to the first embodiment only in this point and thus description of the other configuration is omitted.

Figure 20:
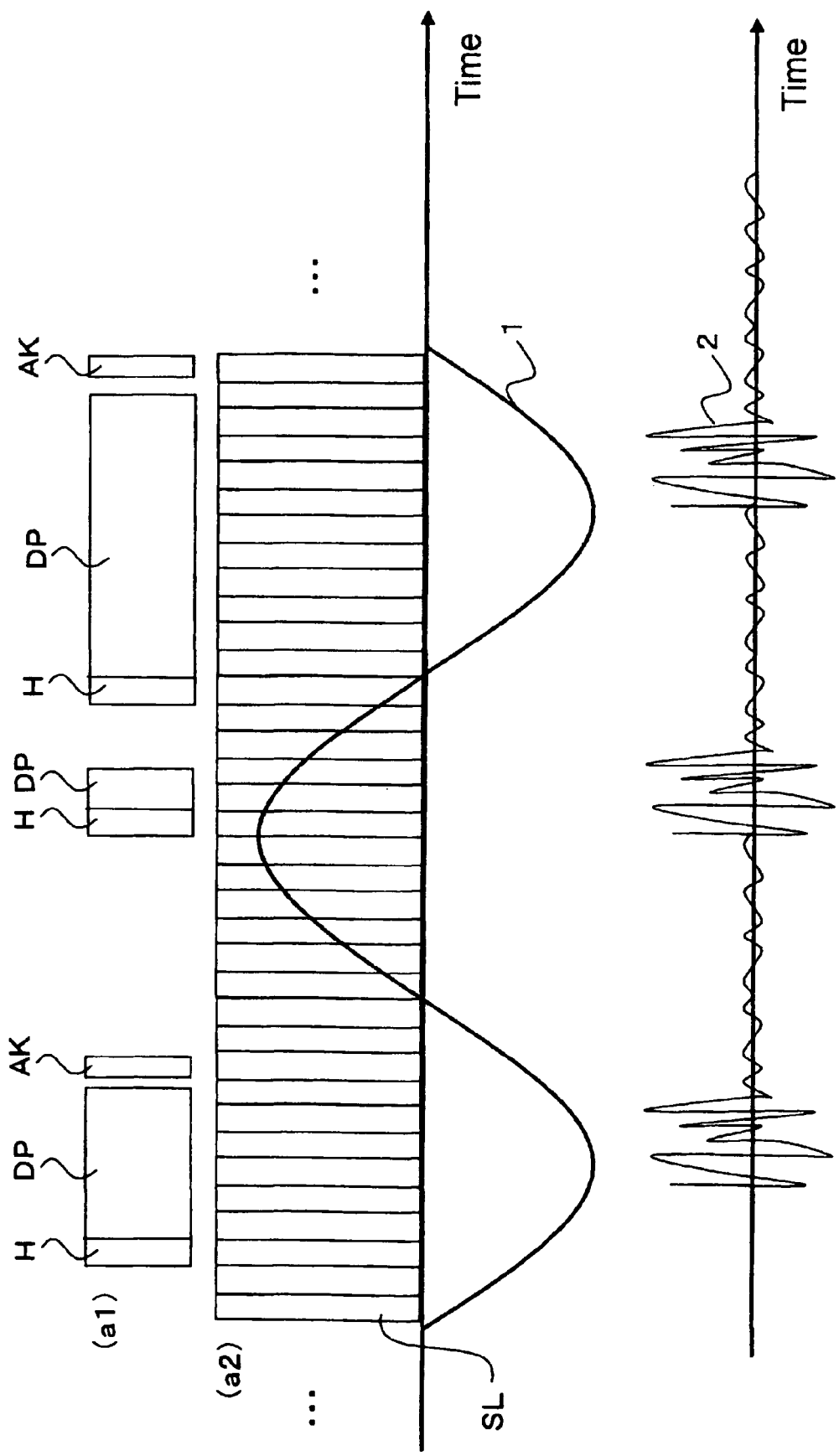
FIG. 20 is a diagram illustrating a slot structure in a power-line communication system according to a second embodiment of the invention.

FIG. 20 shows a configuration of slots in the power-line communication system according to the second embodiment of the invention. FIG. 20 shows a packet transmission timing synchronized with the AC power source 1, where (a1) shows packets and (a2) shows a slot train. In the system shown in FIG. 20, the transmission and reception of data is performed with respect to slots SL (reference sign is added to only one slot in FIG. 20) synchronized with the period of the AC power source 1. That is, the headers H, the data packets DP, and the Ack packets AK are transmitted in synchronization with the slots SL.

The width of the respective slots SL is very small, corresponds to the width of an FEC block, a fragment block, or a symbol block, and is eventually equal to the width of a unit symbol. In this embodiment, the communication channel estimation process (the noise detection process of the noise superimposed on the power source in the communication medium) is performed in the unit of slots.

Figure 21A:
FIG. 21 is a diagram illustrating an example of a noise detection packet transmission timing in the power-line communication system according to the second embodiment of the invention.
Figure 21B:
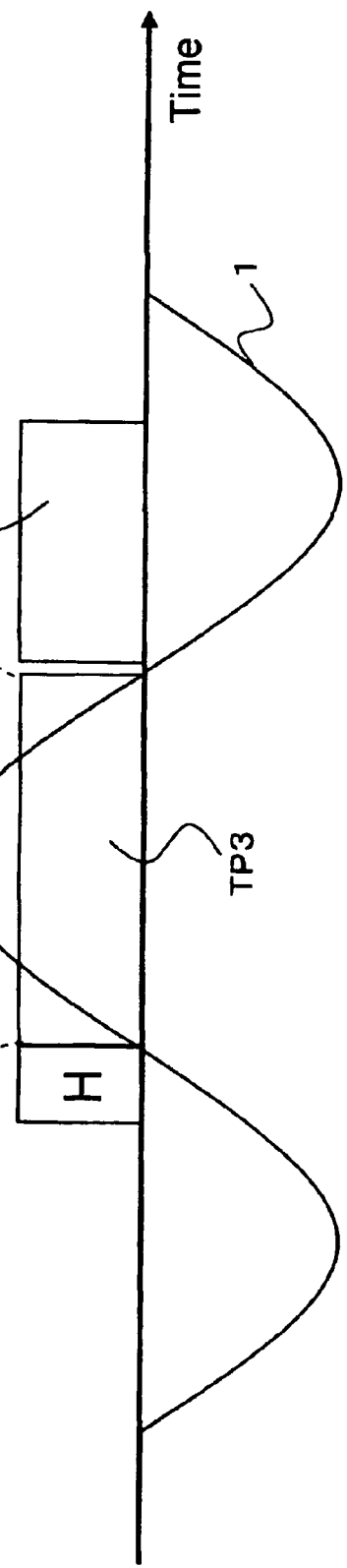
Figure 21C:
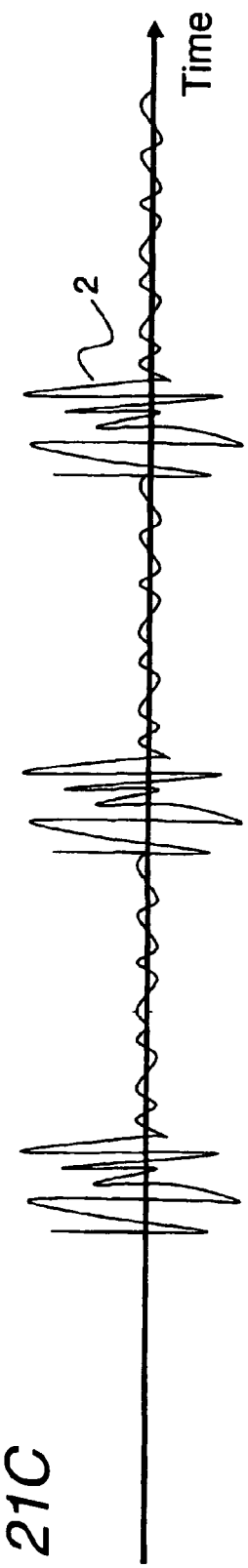

FIG. 21 shows an example of a packet transmission timing for detecting the noise condition in the power-line communication system according to the second embodiment of the invention. As shown in FIG. 21, the payload of the noise detection packet TP3 has a length (for example, 8.3 ms) corresponding to a half period of the AC power source 1. Subsequently to the noise detection packet TP3, a packet AK3+CE3 indicating the Ack and the CE result from the reception-side PLC device is transmitted. The payload of the packet TP3 is partitioned in the same unit as the slot structure as shown in the enlarged view of the upper portion of FIG. 21, and is transmitted and received in synchronization with the slot structure. At this time, the communication channel estimation process for detecting the noise condition is performed in the unit of slots and the estimation result (the information on the noise condition in the communication medium) is notified to the transmission side. In order to use tone maps suitable for the slots, a communication channel estimation process for deciding the tone maps for the slots is performed. The estimation result (the information on the tone maps used for the slots) is transmitted to the transmission side. The usual data packets or the control packets are transmitted and received synchronization with the slots and the tone maps suitable for the slots are used to transmit and received the packets. In other words, the tone maps are changed in the unit of symbol blocks for communication. Although the packet TP3 having a length corresponding to a half period of the AC power source 1 is used in FIG. 21, the packet may have a length corresponding to the entire period of the AC power source 1. Plural packets having a length smaller than or equal to the half period of the AC power source 1 may be used.

The information on the noise detection and the information on the tone map preparation used for the slots may be simultaneously acquired by only one time of communication channel estimation. When the unit of slot is sufficiently smaller than a noise varying segment, it is possible to keep sufficient performance only by changing the tone maps in the unit of slots without performing the communication channel estimation process for detecting the noise condition. When the precision is slightly reduced but the unit of slots is increased, it is possible to simplify the entire processes (for example, reduction in process time and reduction in process load).

In the CSMA (Carrier Sense Multiple Access) communication, it can be considered that the transmission time is not synchronized with the slots for the purpose of back-off, because a throttle unit and a back-off unit are not synchronized with each other or the slot unit and the back-off unit have a relation of the least common multiple. By minutely adjusting the block position in the payload depending on the magnitude of the back-off, it is possible to cope with such a situation.

Figure 22:
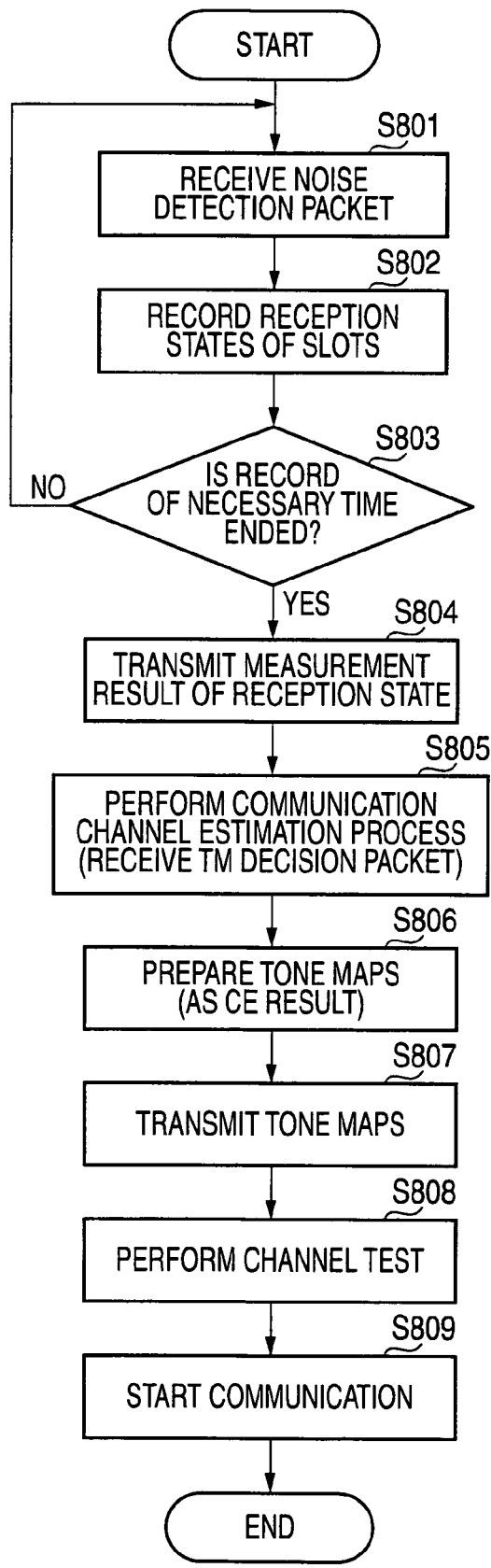
FIG. 22 is a flow diagram illustrating an example of an operation of a reception-side power-line communication device in the power-line communication system according to the second embodiment of the invention.

FIG. 22 is a flow diagram illustrating an example of operations of a reception-side power-line communication device in the power-line communication system according to the second embodiment of the invention. When the noise detection packet is received in step S801, the reception state of the packet is recorded in the unit of slots (step S802). Then, it is determined whether the reception state for the necessary period of time (the period of time corresponding to a half period of the AC power source) is recorded (step S803). When the reception state for the necessary period of time is recorded, the process of step S804 is performed. When the reception state is not recorded, the processes of step S801 and steps subsequent thereto are repeated.

In step S804, the measurement result of the reception state and the noise detection packet are transmitted to the transmission-side PLC device. Subsequently, in step S805, a tone map (TM) decision packet is received from the transmission-side PLC device. The tone maps for the slots are prepared on the basis of the received tone map decision packet (step S806). In step S807, the tone maps prepared for the slots are transmitted to the transmission-side PLC device and the channel test is performed in step S808. The channel test may be omitted. Then, the communication is started in step S809.

Figures 23, 24:
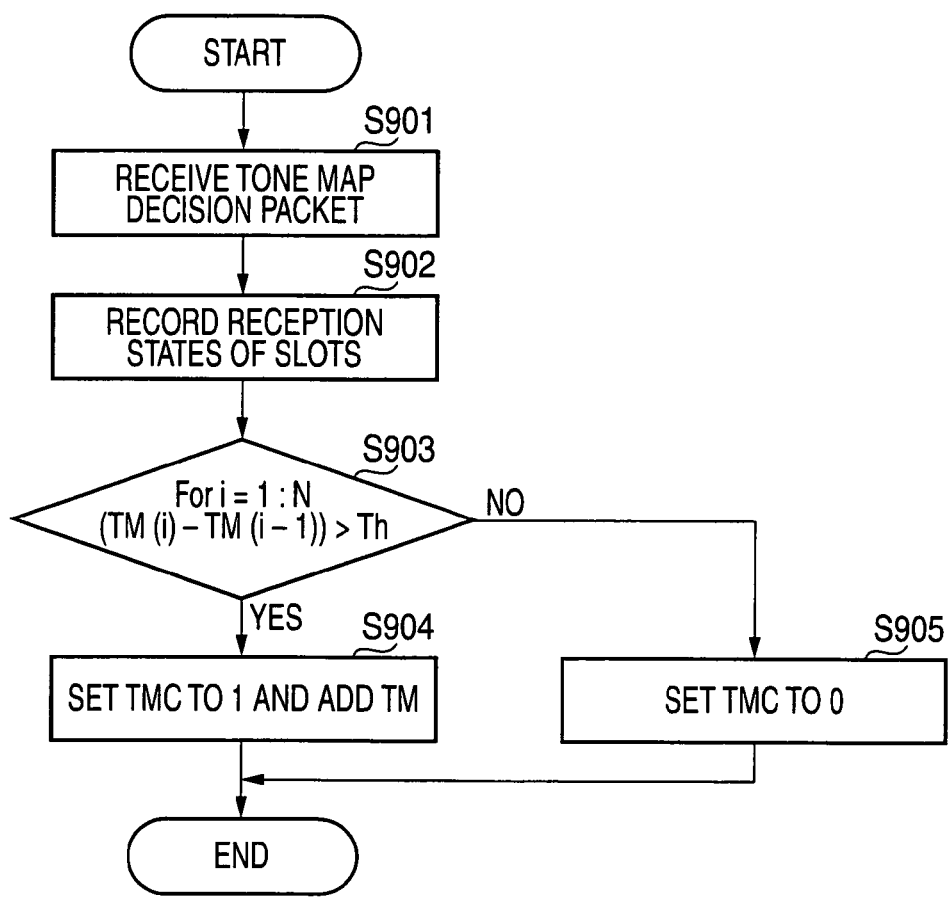
FIG. 23 is a flow diagram illustrating another example of an operation of the reception-side power-line communication device in the power-line communication system according to the second embodiment of the invention.
FIG. 24 is a diagram illustrating an example of a noise transmission format in the power-line communication system according to the second embodiment of the invention.

FIG. 23 is a flow diagram illustrating another example of operations of the reception-side communication device in the power-line communication system according to the second embodiment of the invention and FIG. 24 is a diagram illustrating an example of a noise transmission format in the power-line communication system according to the second embodiment of the invention. When the tone map preparation packet is received in step S901, the reception state of the packet is recorded in the unit of slots (step S902). As a result, for example, as shown in FIG. 24, TMs different from the TMC (Tone Map Condition) is transmitted to the transmission side. Accordingly, the transmission efficiency is improved and the amount of memory to be used is reduced, in comparison with transmission of all the TMs. Therefore, in step S903, the TMs of N blocks in the received packet are compared with each other. When the difference therebetween is equal to or less than a threshold value, the TMC is set to 0 (step S905). When the difference is greater than the threshold value, the TMC is set to 1 and the TMs are added (step S904). This information is transmitted to the transmission-side PLC. Here, the transmission efficiency is enhanced using the TMC and the TM, but the differences between the TMs (the differences between the TM(i) and the TM(i−1): carrier numbers and values having different communication channel estimation results) may be transmitted to enhance the efficiency.

The invention is useful as a power-line communication method, a power-line communication device, and a power-line communication system, which can make communication with high communication efficiency even when the state of a power line is changed.

The present application is based on Japan Patent Application No. 2007-143794 filed on May 30, 2007, and Japan Patent Application No. 2008-100545 filed on Apr. 8, 2008, the contents of which are incorporated herein for reference.

What is claimed is:

1. A power-line communication method of performing multi-carrier communication with a communication device using a power line as a communication medium, the power-line communication method comprising:
- detecting a noise condition in the communication medium in correspondence to a period synchronized with a power source cycle of the power line;
- generating a plurality of communication channels in a time domain in accordance with a comparison result of the noise condition with a predetermined value on the basis of the noise condition detected in the noise detection process;
- preparing tone maps corresponding to the plurality of communication channels generated in the communication channel decision process; and
- transmitting and receiving data on the basis of the tone maps prepared in the tone map preparation process,
- wherein the communication channel decision process and the tone map preparation process are performed again after the communication process is performed.

2. The power-line communication method according to claim 1, wherein the noise detection process includes:
- transmitting a packet for detecting the noise condition in the communication medium; and
- detecting the noise condition on the basis of a received signal in response to the packet transmitted in the noise detection packet transmission process.

3. The power-line communication method according to claim 2, wherein the packet transmitted in the noise detection packet transmission process is transmitted in synchronization with the power source cycle.

4. The power-line communication method according to claim 1, further comprising:
- detecting a variation of condition in the communication medium,
- wherein when it is detected in the communication medium variation detection process that the condition in the communication medium varies more than a predetermined amount, the noise detection process, the communication channel generation process, and the tone map preparation process are performed again.

5. The power-line communication method according to claim 1, further comprising:
- receiving a measurement result in the communication medium from the communication device and detecting a variation of condition in the communication medium, during communication with the communication device in the communication process,
- wherein when it is detected in the communication medium condition variation detection process that the condition in the communication medium varies more than a predetermined amount, the communication channel decision process and the tone map preparation process are performed again.

6. The power-line communication method according to claim 1, further comprising:
- detecting a variation of condition in the communication medium, during communication in the communication process,
- wherein when it is detected in the communication medium condition variation detection process that the condition in the communication medium varies more than a predetermined amount, a transmission time of a transmission packet with respect to the power source period is changed in the communication process.

7. The power-line communication method according to claim 1, wherein the tone maps are information indicating a modulation scheme of each of a plurality of carriers used in communication using the communication media.

8. A power-line communication method of performing multi-carrier communication with a communication device using a power line as a communication medium, the power-line communication method comprising:
- detecting a noise condition in the communication medium in correspondence to a period synchronized with a power source cycle of the power line;
- generating a plurality of communication channels in a time domain in accordance with a comparison result of the noise condition with a predetermined value on the basis of the noise condition detected in the noise detection process;
- preparing tone maps corresponding to the plurality of communication channels generated in the communication channel decision process;
- transmitting and receiving data on the basis of the tone maps prepared in the tone map preparation process; and
- receiving a measurement result of the communication medium from the communication device and detecting a variation in state of the communication medium, during communication with the communication device in the communication process,
- wherein when it is detected in the communication medium condition variation detection process that the condition in the communication medium varies more than a predetermined amount, the communication channel decision process and the tone map preparation process are performed again.

9. A power-line communication device for performing multi-carrier communication using a power line as a communication medium, the power-line communication device comprising:
- a reception section which receives a noise condition in the communication medium sent from a reception-side power-line communication device through the power line;
- a transmission section which transmits a signal through the power line; and
- a control section which detects the noise condition in the communication medium received by the reception section in correspondence to a time domain synchronized with a power source period of the power line, generates a plurality of communication channels in the time domain on the basis of the noise condition in the communication medium, and controls the transmission section to transmit data using tone maps corresponding to the plurality of communication channels,
- wherein the transmission section transmits a packet for detecting the noise condition in the communication medium;
- wherein the reception section receives the noise condition in the communication medium transmitted from a different power-line communication device which receives the packet, and
- wherein the control section generates the communication channels on the basis of a condition of noise.

10. The power-line communication device according to claim 9, wherein the transmission section transmits the packet for detecting the noise condition in the communication medium in synchronization with a power source cycle.

11. The power-line communication device according to claim 9, wherein when a variation of a condition in the communication medium is detected during a transmission from the transmission section, the control section generates a new communication channel on the basis of a new noise condition in the communication medium and the transmission section transmits data using a tone map corresponding to the new communication channel generated by the control section.

12. The power-line communication device according to claim 9, wherein when a variation of a condition in the communication medium is detected during a transmission from the transmission section, the control section generates a new communication channel on the basis of the noise condition used in preparing the tone maps used for the transmission and the transmission section transmits data using a tone map corresponding to the new communication channel generated by the control section.

13. The power-line communication device according to claim 9, wherein when a variation of a condition in the communication medium is detected during a transmission from the transmission section, the transmission section changes a transmission time of the packet with respect to a power source cycle.

14. The power-line communication device according to claim 9, wherein the transmission section transmits a beacon to other power-line communication devices connected to the power line, and
wherein the control section determines a beacon transmission time using the generated communication channels with the other power-line communication devices.

15. The power-line communication device according to claim 9, wherein the control section manages communication between all the power-line communication devices connected to the power line and assigns communication bands between the power-line communication devices on the basis of the communication channels between all the power-line communication devices.

16. The power-line communication device according to claim 9, wherein the tone maps are information indicating a modulation manner of each of a plurality of carriers used in communication using the communication channels.

17. A power-line communication device for performing multi-carrier communication using a power line as a communication medium, the power-line communication device comprising:
a reception section which receives a signal from the power line;
a transmission section which transmits a noise condition in the communication medium to a transmission-side power-line communication device through the power line: and
a control section which detects the noise condition in the communication medium in correspondence to a time domain synchronized with a power source cycle of the power line on the basis of the signal received by the reception section, prepares tone maps corresponding to each of a plurality of communication channels in the time domain generated by the transmission-side power-line communication device on the basis of the noise condition, and controls the reception section to receive data using the prepared tone maps,
wherein the control section detects the noise condition on the basis of a reception state of a noise detection packet received in the reception section from a different power-line communication device.

18. The power-line communication device according to claim 17, wherein the control section stores the tone maps received from the transmission-side power-line communication device.

19. The power-line communication device according to claim 17, wherein the control section detects the noise condition using at least one of a carrier power to interference power plus noise power ratio of a signal transmitted through the communication medium, the carrier power to the noise power ratio of the signal, an error rate of transmission data, and the number of retransmissions or a retransmission rate of the transmission data.

20. The power-line communication device according to claim 17, wherein the control section detects the noise condition in the communication medium in the unit of slots synchronized with a power source period of the power line.

21. The power-line communication device according to claim 17, wherein the tone maps are information indicating a modulation scheme of each of a plurality of carriers used in communication using the communication channels.

22. A power-line communication system for performing multi-carrier communication using a power line as a communication medium, the power-line communication system comprising:
a first power-line communication device including:
a reception section which receives a noise condition in the communication medium sent from a reception-side power-line communication device through the power line;
a transmission section which transmits a signal through the power line; and
a control section which detects the noise condition in the communication medium received by the reception section in correspondence to a time domain synchronized with a power source cycle of the power line, generates a plurality of communication channels in the time domain on the basis of the noise condition in the communication medium, and controls the transmission section to transmit data using tone maps corresponding to the plurality of communication channels; and
a second power-line communication device including:
a reception section which receives a signal from the power line;
a transmission section which transmits a noise condition in the communication medium to a transmission-side power-line communication device through the power line; and
a control section which detects the noise condition in the communication medium in correspondence to a time domain synchronized with a power source cycle of the power line on the basis of the signal received by the reception section, prepares tone maps corresponding to each of a plurality of communication channels in the time domain generated by the transmission-side power-line communication device on the basis of the noise condition, and controls the reception section to receive data using the prepared tone maps.

* * * * *